United States Patent
Do et al.

(10) Patent No.: US 12,501,328 B2
(45) Date of Patent: Dec. 16, 2025

(54) ELECTRONIC DEVICE AND METHOD FOR PERFORMING EMERGENCY SERVICE IN WIRELESS COMMUNICATION SYSTEM

(71) Applicant: Samsung Electronics Co., Ltd., Suwon-si (KR)

(72) Inventors: Thi Thuy Van Do, Yen Phong district (VN); Trung Hieu Nguyen, Yen Phong district (VN); The Thoi Nguyen, Yen Phong district (VN); Van Thinh Nguyen, Yen Phong district (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 18/362,378

(22) Filed: Jul. 31, 2023

(65) Prior Publication Data

US 2024/0155448 A1 May 9, 2024

Related U.S. Application Data

(63) Continuation of application No. PCT/KR2023/010176, filed on Jul. 17, 2023.

(30) Foreign Application Priority Data

Nov. 7, 2022 (KR) .......................... 10-2022-0147438

(51) Int. Cl.
*H04W 36/00* (2009.01)
(52) U.S. Cl.
CPC .......................... *H04W 36/008355* (2023.05)
(58) Field of Classification Search
CPC ....................... H04W 36/00; H04W 36/008355
See application file for complete search history.

(56) References Cited

U.S. PATENT DOCUMENTS

| | | |
|---|---|---|
| 2021/0021981 A1 | 1/2021 | Lauster |
| 2021/0195654 A1 | 6/2021 | Lei et al. |

(Continued)

FOREIGN PATENT DOCUMENTS

| | | |
|---|---|---|
| CN | 111885674 A | 11/2020 |
| CN | 112640532 A | 4/2021 |

(Continued)

OTHER PUBLICATIONS

3rd Generation Partnership Project; Technical Specification Group Services and System Aspects; System architecture for the 5G System (5GS); Stage 2 (Release 17), 3GPP TS 23.501 V17.4.0, Mar. 2022.
3rd Generation Partnership Project; Technical Specification Group Services and System Aspects; Procedures for the 5G System (5GS); Stage 2 (Release 18), 3GPP TS 23.502 V18.2.0, Jun. 2023.

(Continued)

*Primary Examiner* — Myron Wyche
(74) *Attorney, Agent, or Firm* — Jefferson IP Law, LLP

(57) ABSTRACT

A method performed by a terminal in a wireless communication system is provided. The method includes receiving, from a serving base station, a radio resource control (RRC) message including a handover command to new radio (NR) cell, while performing an emergency service on long term evolution (LTE) cell. The method includes identifying whether the NR cell supports a reduced capability (RedCap) function, based on system information on the NR cell. The method includes switching an operation mode of the terminal from RedCap mode to an NR normal mode, in case that the NR cell does not support RedCap function. The method includes, while the terminal operates in the NR normal mode, performing the emergency service on the NR cell through access to the NR cell. The method includes, in response to termination of the emergency service, switching the operation mode of the terminal from NR normal mode to RedCap mode.

20 Claims, 21 Drawing Sheets

(56) References Cited

U.S. PATENT DOCUMENTS

| | | | |
|---|---|---|---|
| 2021/0297916 A1 | 9/2021 | Futaki et al. | |
| 2022/0232670 A1 | 7/2022 | Tiwari et al. | |
| 2023/0036057 A1* | 2/2023 | Lei | H04W 8/22 |
| 2023/0079810 A1 | 3/2023 | Zheng et al. | |
| 2023/0140726 A1 | 5/2023 | Watfa | |
| 2024/0040477 A1 | 2/2024 | Li | |
| 2024/0155442 A1 | 5/2024 | Jang et al. | |

FOREIGN PATENT DOCUMENTS

| | | | |
|---|---|---|---|
| CN | 113676957 A | 11/2021 | |
| CN | 115134797 A | 9/2022 | |
| KR | 10-2022-0024103 A | 3/2022 | |
| WO | 2021/136650 A1 | 7/2021 | |
| WO | 2021/155822 A1 | 8/2021 | |
| WO | 2021/206295 A1 | 10/2021 | |
| WO | 2022/028685 A1 | 2/2022 | |
| WO | 2022/033517 A1 | 2/2022 | |
| WO | 2022/211371 A1 | 10/2022 | |

OTHER PUBLICATIONS

3rd Generation Partnership Project; Technical Specification Group Radio Access Network; NR; User Equipment (UE) procedures in Idle mode and RRC Inactive state (Release 17), 3GPP TS 38.304 V17.5.0, Jun. 2023.

3rd Generation Partnership Project; Technical Specification Group Radio Access Network; NR; Radio Resource Control (RRC) protocol specification (Release 17), 3GPP TS 38.331 V17.5.0, Jun. 2023.

3rd Generation Partnership Project; Technical Specification Group Radio Access Network; NG-RAN; NG Application Protocol (NGAP) (Release 17), 3GPP TS 38.413 V17.5.0, Jun. 2023.

Huawei et al., Inter-RAT mobility from LTE to NR, R2-2203712, 3GPP TSG-RAN WG2 Meeting #117-e Electronic, Feb. 21-Mar. 3, 2022.

CMCC, Discussion on RedCap Capability Exchange, R3-215679, 3GPP TSG-RAN WG3 #114-e, Nov. 1-Nov. 11, 2021 e-Meeting.

International Search Report and Written Opinion dated Nov. 3, 2023, issued in International Application No. PCT/KR2023/010176.

* cited by examiner

ELECTRONIC DEVICE AND METHOD FOR PERFORMING EMERGENCY SERVICE IN WIRELESS COMMUNICATION SYSTEM

CROSS-REFERENCE TO RELATED APPLICATION(S)

This application is a continuation application, claiming priority under § 365(c), of an International application No. PCT/KR2023/010176, filed on Jul. 17, 2023, which is based on and claims the benefit of a Korean patent application number 10-2022-0147438, filed on Nov. 7, 2022, in the Korean Intellectual Property Office, the disclosure of which is incorporated by reference herein in its entirety.

TECHNICAL FIELD

The disclosure relates to a wireless communication system. More particularly, the disclosure relates to an electronic device and a method for performing an emergency service in a wireless communication system.

BACKGROUND ART

Along with the development of mobile communication networks, the 3rd Generation Partnership Project (3GPP) and the European Telecommunications Standards Institute (ETSI) are discussing schemes to reduce complexity in performing channel access and communication for devices with low complexity. In New Radio (NR) communication systems, definition is made of a terminal supporting a reduced capability (RedCap) function, also referred to as an NR light.

The above information is presented as related arts only to assist with an understanding of the present disclosure. No determination has been made, and no assertion is made, as to whether any of the above might be applicable as a prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device and a method for performing an emergency service in a wireless communication system.

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a serving base station, a radio resource control (RRC) message including a handover command to a new radio (NR) cell, while performing an emergency service on a long term evolution (LTE) cell. The method may include identifying whether the NR cell supports a reduced capability (RedCap) function or not, based on system information on the NR cell. The method may include switching an operation mode of the terminal from a RedCap mode to a NR normal mode, in case that the NR cell does not support the RedCap function. The method may include, while the terminal operates in the NR normal mode, performing the emergency service on the NR cell through an access to the NR cell. The method may include, in response to a termination of the emergency service, switching the operation mode of the terminal from the NR normal mode to the RedCap mode.

In accordance with an aspect of the disclosure, A terminal in a wireless communication system is provided. The terminal includes at least one transceiver and at least one processor coupled to the at least one transceiver. The at least one processor may be configured to receive, from a serving base station, a radio resource control (RRC) message including a handover command to a new radio (NR) cell, while performing an emergency service on a long term evolution (LTE) cell. The at least one processor may be configured to identify whether the NR cell supports a reduced capability (RedCap) function or not based on system information on the NR cell. The at least one processor may be configured to switch an operation mode of the terminal from a RedCap mode to an NR normal mode, in case that the NR cell does not support the RedCap function. The at least one processor may be configured to, while the terminal operates in the NR normal mode, perform the emergency service on the NR cell through an access to the NR cell. The at least one processor may be configured to, in response to a termination of the emergency service, switch the operation mode of the terminal from the NR normal mode to the RedCap mode.

In accordance with an aspect of the disclosure, a non-transitory computer-readable medium is provided. The non-transitory computer-readable comprise a memory storing instructions. When the instructions are executed by a processor, the instructions cause the terminal to receive, from a serving base station, a radio resource control (RRC) message including a handover command to a new radio (NR) cell, while performing an emergency service on a long term evolution (LTE) cell, identify whether the NR cell supports a reduced capability (RedCap) function or not based on system information on the NR cell, in case that the NR cell does not support the RedCap function, switch an operation mode of the terminal from a RedCap mode to an NR normal mode, while the terminal operates in the NR normal mode, perform the emergency service on the NR cell through an access to the NR cell, and in response to a termination of the emergency service, switch the operation mode of the terminal from the NR normal mode to the RedCap mode.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
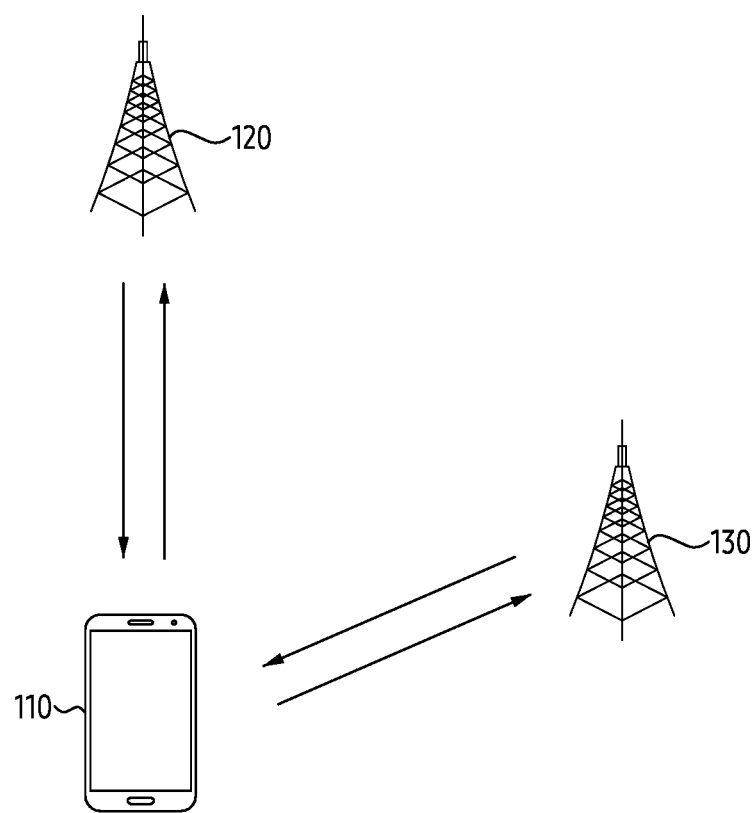
FIG. 1 illustrates an example of a wireless communication system.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various examples of the disclosure described below, a hardware approach will be described as an example. However, since various embodiments of the disclosure may include a technology that utilizes both the hardware-based approach and the software-based approach, the various embodiments are not intended to exclude the software-based approach.

As used in the following description, terms for signaling (e.g., signal, information, message, signaling, or the like), terms for resources (e.g., symbol, slot, subframe, radio frame, subcarrier, resource element (RE), resource block (RB), bandwidth part (BWP), occasion, or the like), terms for operational states (e.g., step, operation, procedure, or the like), terms for data (e.g., packet, user stream, information, bit, symbol, codeword, or the like), terms for channels, terms for network entities, terms for components of an apparatus, and so on are exemplified only for convenience of description. Therefore, the disclosure is not limited to those terms described below, and other terms having the same or equivalent technical meaning may be used therefor.

Further, throughout the disclosure, an expression such as e.g., 'more than' or 'less than' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with 'more than', a condition described as 'less than or equal to' may be replaced with 'less than', and a condition described as 'more than or equal to and less than' may be replaced with 'more than and less than or equal to', respectively. Furthermore, hereinafter, 'A' to 'B' may refer to at least one of the elements from A (including A) to B (including B). Hereinafter, 'C' and/or 'D' may refer to including at least one of 'C' or 'D', that is, {'C', 'D', or 'C' and 'D'}.

The disclosure describes various embodiments using the terms used in some telecommunications standards (e.g., 3rd Generation Partnership Project (3GPP), European Telecommunications Standards Institute (ETSI), extensible radio access network (xRAN), and open-radio access network (O-RAN), but they are for illustrative purposes only. Various embodiments of the disclosure may be readily adapted and applied to other communication systems.

The reduced capability (RedCap) function (or feature) is a new feature introduced in 3GPP Release 17, which enables a terminal supporting the RedCap function to access fifth generation (5G) networks so as to provide longer life time and lower costs. RedCap UEs have reduced capabilities to reduce complexity compared to non-RedCap UEs. For example, unlike a legacy terminal, a RedCap UE has to support 20 megahertz (MHz) in frequency range (FR) 1 (e.g., −7.125 gigahertz (GHz)) and 100 MHz in frequency range (FR) 2 (e.g., 24.25 GHz to 71 GHz) in its maximum channel bandwidth. Hereinafter, for the purposes of explanation of the disclosure, a terminal capable of supporting such a reduced capability (RedCap) function may be referred to as a RedCap device or a RedCap UE. There are two types of RedCap UEs.

The first type of device may support only the RedCap function and include wearable devices (e.g., smart watches, medical devices, augmented reality (AR), virtual reality (VR) glasses, etc.), industrial wireless sensors, video surveillance, or the like.

The second type of device may operate with a basic mode (or legacy mode) or a RedCap mode. In the RedCap mode, the device may have an excellent effect of reduced power consumption compared to the basic mode, due to some network-related features (e.g., discontinuous reception (DRX) expansion, BWP reduction, radio resource management (RRM) relaxation, etc.). The basic mode refers to a communication mode for a RedCap UE in an NR communication system, that is, a normal communication mode other than the RedCap mode.

Hereinafter, the disclosure relates to an apparatus and method for performing an emergency service in an NR cell without performing a radio resource control (RRC) connection re-establishment (RRE) for an existing LTE cell, in case where a RedCap UE receives a handover command to the NR cell that does not support the RedCap function while performing an emergency service in the LTE cell. More specifically, the disclosure describes a technology for switching a UE's mode of operation from a RedCap mode to an NR normal mode to perform the emergency service in the NR cell and again search for an NR cell supporting the RedCap function.

FIG. 1 illustrates an example of a wireless communication environment.

Referring to FIG. 1, FIG. 1 illustrates a terminal 110, a first base station 120, and a second base station 130, as a part of nodes using a wireless channel in a wireless communication system. The terminal 110 may be connected to either the first base station 120 or the second base station 130, or may be connected to both the first base station 120 and the second base station 130.

The terminal 110 is a device used by a user to communicate with the base station 120 through a wireless channel. A link from the base station 120 to the terminal 110 is referred to as a downlink (DL), and a link from the terminal 110 to the base station 120 is referred to as an uplink (UL). Further, although not illustrated in FIG. 1, the terminal 110 and another terminal may communicate with each other over a wireless channel. In this case, a device-to-device link (D2D) between the terminal 110 and another terminal may be referred to as a sidelink, and the sidelink may be used interchangeably with a PC5 interface. In some other embodiments, the terminal 110 may operate without any user involvement. According to an embodiment, the terminal 110 is a device or apparatus that performs machine type communication (MTC) and may not be carried by a user. Further, according to an embodiment, the terminal 110 may be a narrowband (NB)-internet of things (IoT) device. According to an embodiment, the terminal 110 may operate as a RedCap UE. In addition to the term 'terminal', the terminal 110 may be referred to as 'user equipment (UE)', 'customer premises equipment (CPE)', 'mobile station', 'subscriber station', 'remote terminal', 'wireless terminal', 'electronic device', or 'user device', or any other terms having a technical meaning equivalent thereto.

The base station 120 or the base station 130 is a network infrastructure that provides radio access to the terminal 110. The base station 120 or the base station 130 has a coverage defined based on a distance capable of transmitting a signal. According to an embodiment, the base station 120 may provide an access network according to a fourth generation (4G) communication scheme (e.g., long term evolution (LTE)). The base station 120 may provide one or more LTE cells. In addition to the term 'base station', the base station 120 may be referred to as 'access point (AP)', 'eNodeB (eNB)', 'wireless point', 'transmission/reception point (TRP)', or any other terms having a technical meaning equivalent thereto. Further, according to an embodiment, the base station 130 may provide an access network according to a 5G communication scheme (e.g., New Radio (NR)). The base station 130 may provide one or more NR cells. In addition to the term 'base station', the base station 130 may be referred to as 'access point (AP)', 'next-generation Node B (gNB)', '5G Node B (5gNB)', 'wireless point', 'trans-mission/reception point (TRP)', or any other terms having an equivalent technical meaning thereto.

The base station 120 or the base station 130 may perform beamforming with the terminal 110. For example, the base station 130 and the terminal 110 may transmit and receive radio signals in a relatively lower frequency band (e.g., FR 1 of NR). Further, the base station 130 and the terminal 110 may transmit and receive radio signals in a relatively higher frequency band (e.g., FR 2 (or FR 2-1, FR 2-2, FR 2-3) or FR 3 of NR), or millimeter wave (mmWave) band (e.g., 28 GHz, 30 GHz, 38 GHz, or 60 GHz). To improve the channel gain, the base station 130 and the terminal 110 may perform beamforming. Here, the beamforming may include transmission beamforming and reception beamforming. The base station 130 and the terminal 110 may assign directivity to a transmission signal or a reception signal. To this end, the base station 130 and the terminal 110 may select serving beams by means of a beam search or beam management procedure. After the serving beams are selected, subsequent communications may be performed through a resource having quasi co location (QCL)-relation with a resource that transmitted the serving beams.

If large-scale characteristics of the channel transmitting the symbol on a first antenna port could be inferred from the channel transmitting the symbol on a second antenna port, it may be determined that the first antenna port and the second antenna port have a QCL relationship. For example, the large-scale characteristics may include at least one of delay spread, Doppler spread, Doppler shift, average gain, average delay, and spatial receiver parameter.

Figure 2A:
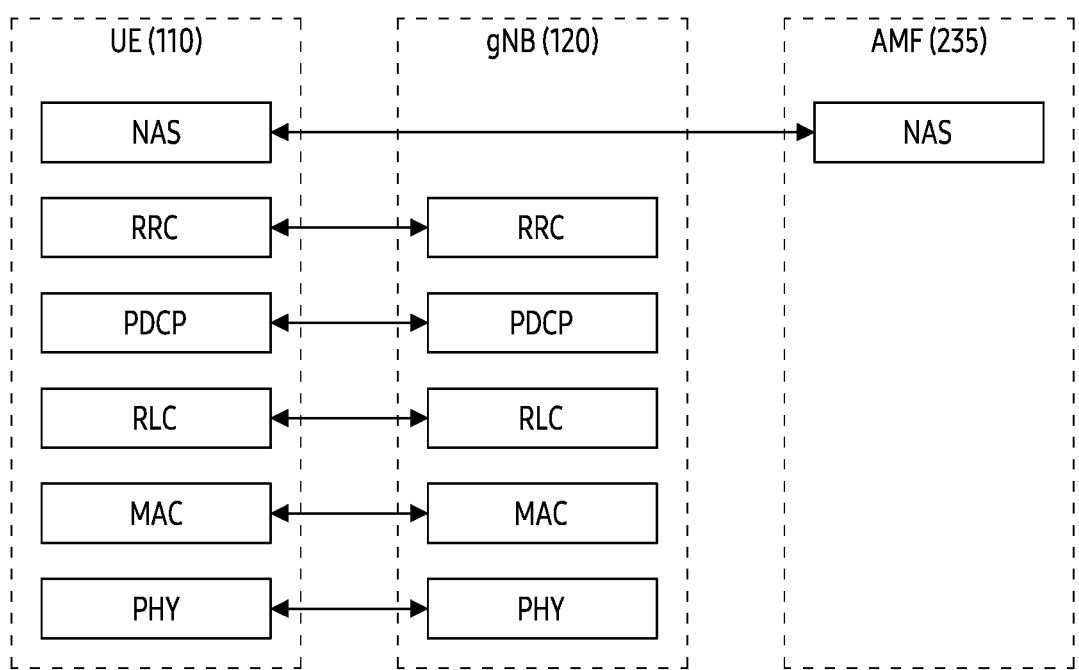
FIG. 2A illustrates an example of a control plane (C-plane)

FIG. 2A illustrates an example of a control plane (C-plane).

Referring to FIG. 2A, description of each layer is made in the NR communication protocol, but at least some of the description may be also applied equally to the LTE communication protocol between the terminal 110 and the base station 120.

Referring to FIG. 2A, in the C-plane, the terminal 110 and a core network entity (e.g., access and mobility management entity (AMF) 235) may perform non-access stratum (NAS) signaling. In the C-plane, the terminal 110 and the base station 130 may perform communications according to a specified protocol in each of a radio resource control (RRC) layer, a packet data convergence protocol (PDCP) layer, a radio link control (RLC) layer, a medium access control (MAC) layer, and a physical (PHY) layer.

The main functions of the RRC layer may include at least some of the following functions:

Access stratum (AS) and NAS-related System Information Broadcasting;
Paging initiated by 5GC (5G core) or NG-RAN (next generation-radio access network);
Establishment, maintenance, and release of RRC connection between UE and NG-RAN including:
Addition, modifying and releasing of carrier aggregation, and
Addition, modifying and releasing of dual connectivity between NR or E-UTRA and NR;
Security functionality including key management;
Setting, configuration, maintaining and releasing of Signaling Radio Bearer (SRB) and Data Radio Bearer (DRB);
Movement functionality including:
Handover and context transfer,
UE cell selection and reselection, and cell selection and reselection control, and
Mobility between RATs;

Quality of Service (QoS) management function;
UE measurement report and control of reporting;
Detection and recovery of radio link failure; and
Sending message from/to UE to/from NAS.

The main functions of the PDCP layer may include at least some of the following functions:
  Header compression and decompression (robust header compression (ROHC) only);
  Transfer of user data;
  In-sequence delivery of upper layer protocol data units (PDUs);
  Out-of-sequence delivery of upper layer PDUs;
  PDCP PDU reordering for reception;
  Duplicate detection of lower layer service data unit (SDUs);
  Retransmission of PDCP SDUs;
  Ciphering and deciphering; and
  Timer-based SDU discard in uplink.

The main functions of the RLC layer may include at least some of the following functions:
  Transfer of upper layer PDUs;
  In-sequence delivery of upper layer PDUs;
  Out-of-sequence delivery of upper layer PDUs;
  Automatic repeat request (ARQ) function (Error Correction through ARQ);
  Concatenation, segmentation and reassembly of RLC SDUs;
  Re-segmentation of RLC data PDUs;
  Reordering of RLC data PDUs;
  Duplicate detection;
  Protocol error detection;
  RLC SDU discard; and
  RLC re-establishment.

The MAC layer may be connected to several RLC layer devices configured in one terminal, and the main functions of the MAC may include at least some of the following functions:
  Mapping between logical channels and transport channels;
  Multiplexing/demultiplexing of MAC SDUs;
  Scheduling information reporting;
  hybrid automatic repeat request (HARQ) function (Error correction through HARQ);
  Priority handling between logical channels of one UE;
  Priority handling between UEs by means of dynamic scheduling;
  multimedia broadcast/multicast service (MBMS) service identification;
  Transport format selection; and
  Padding.

The physical layer may include channel coding and modulation of upper layer data, making the upper layer data into an orthogonal frequency-division multiplexing (OFDM) symbol to transmit the OFDM symbol to a wireless channel, or demodulating and channel-decoding the OFDM symbol received through the wireless channel to transmit the OFDM symbol to the upper layer.

Figure 2B:
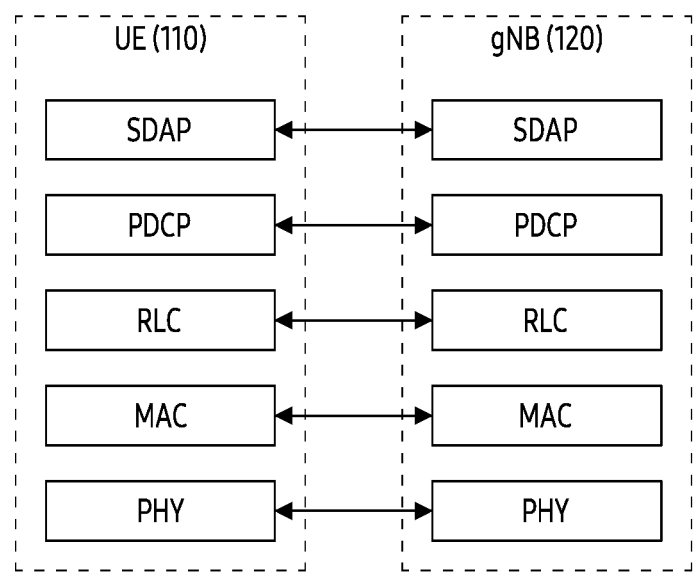
FIG. 2B illustrates an example of a user plane (U-plane)

FIG. 2B illustrates an example of a user plane (U-plane). In FIG. 2A, description of each layer is described in the NR communication protocol, and at least some of the description may be also applied equally to the LTE communication protocol between the terminal 110 and the base station 120.

Referring to FIG. 2B, in the U-plane, the terminal 110 and the base station 130 may perform communications according to a specified protocol in each of a service data adaptation protocol (SDAP) layer, a PDCP layer, an RLC layer, a MAC layer, and a PHY layer. For the PDCP layer, the RLC layer, the MAC layer, and the PHY layer except for the SDAP layer, the description of FIG. 3 may be referred thereto.

The SDAP layer may provide a QoS flow of 5GC. The single protocol entity of SDAP may be configured for each individual PDU session, and the function of the SDAP layer may include at least some of the following functions:
  Mapping between QoS flow and data wireless bearer; and
  Displaying QoS Flow ID (QFI) in both DL and UL packets.

Figure 3:
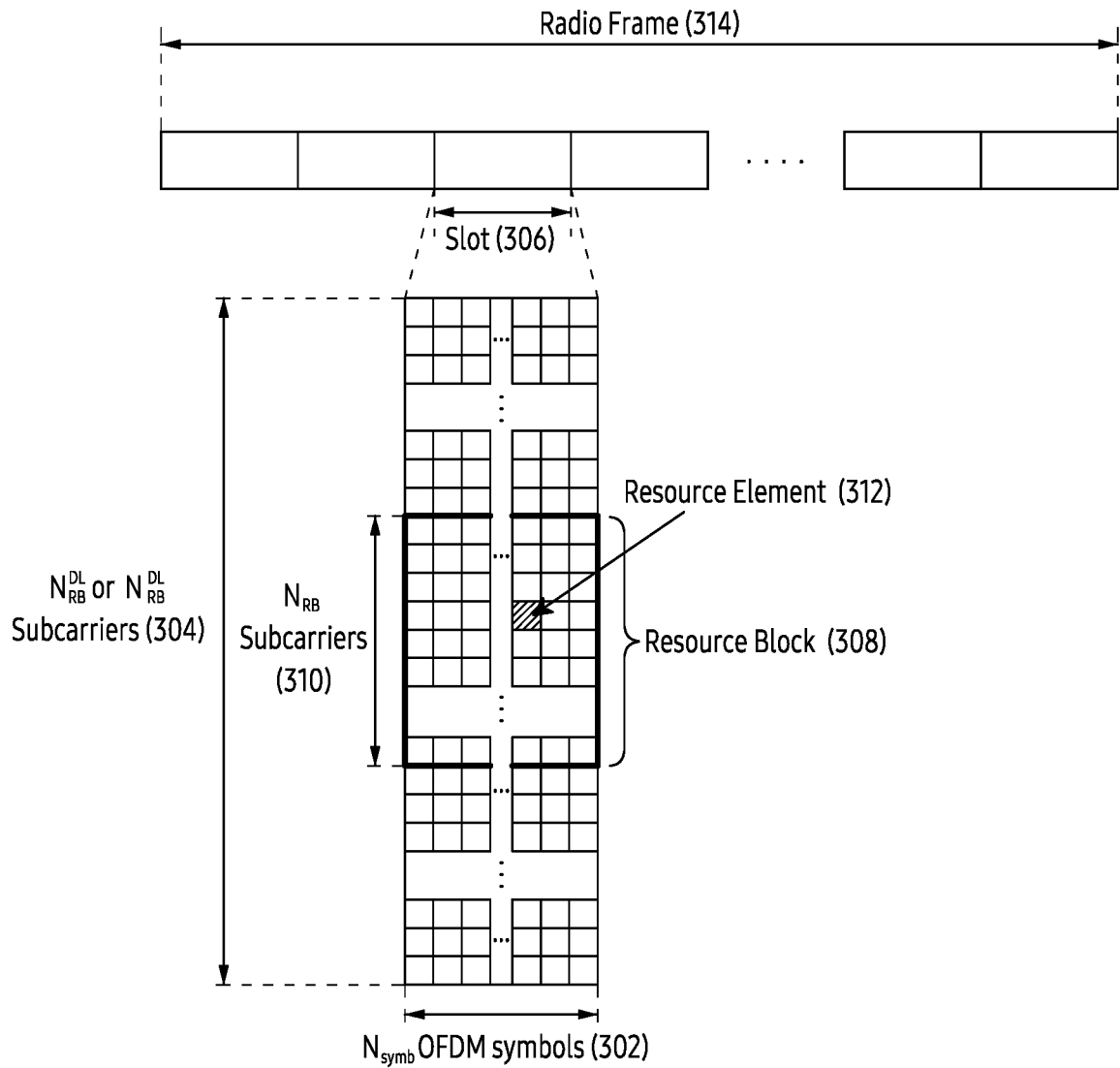
FIG. 3 illustrates an example of a resource structure in a time domain and a frequency domain.

FIG. 3 illustrates an example of a resource structure in a time domain and a frequency domain. Further, FIG. 3 illustrates a basic structure of a time-frequency domain, which is a radio resource region in which data or a control channel is transmitted in a downlink or an uplink.

Referring to FIG. 3, its horizontal axis represents the time domain and its vertical axis represents the frequency domain. The minimum transmission unit in the time domain is an OFDM symbol, and $N_{symb}$ OFDM symbols 302 are gathered to form one slot 306. The length of the subframe is defined as 1.0 ms, and the length of the radio frame 314 is defined as 10 ms. The minimum transmission unit in the frequency domain is a subcarrier, and a carrier bandwidth making up a resource grid is configured of $N_{BW}$ subcarriers 304.

In the time-frequency domain, a basic unit of a resource is a resource element (hereinafter, referred to as "RE") 312, which may be represented by an OFDM symbol index and a subcarrier index. A resource block may include a plurality of resource elements. In the LTE system, the resource block (RB) (or a physical resource block, hereinafter, referred to as "PRB") is defined as $N_{symb}$ consecutive OFDM symbols in the time domain and $N_{SC}^{RB}$ consecutive subcarriers in a frequency domain. In an NR system, the resource block RB 308 may be defined as $N_{SC}^{RB}$ consecutive subcarriers 310 in the frequency domain. One RB 308 includes $N_{SC}^{RB}$ REs 312 in a frequency axis. In general, the minimum transmission unit of data is RB and the number of subcarriers is $N_{SC}^{RB}=12$. The frequency domain may include common resource blocks (CRBs). A physical resource block (PRB) may be defined in a bandwidth part BWP on the frequency domain. The CRB and PRB numbers may be determined according to a subcarrier spacing. The data rate may increase in proportion to the number of RBs scheduled for a terminal.

In the NR system, in case of a frequency division duplexing (FDD) system being operated by dividing a downlink and an uplink by frequency, a downlink transmission bandwidth and an uplink transmission bandwidth may be different from each other. The channel bandwidth represents a radio frequency (RF) bandwidth corresponding to a system transmission bandwidth. Table 1 below shows some of the correspondence in between the system transmission bandwidth, the subcarrier spacing (SCS), and the channel bandwidth defined in the NR system in a frequency band (e.g., FR 1 (310 MHz to 7125 MHz)) lower than x GHz. Further, Table 2 below shows some of the correspondence between the transmission bandwidth, the subcarrier interval, and the channel bandwidth defined in the NR system in a frequency band (e.g., FR2 (24250 MHz to 52600 MHz) or FR2-2 (52600 MHz to 71000 MHz)) higher than y GHz. For example, an NR system having a 100 MHz channel bandwidth at 30 kHz subcarrier intervals has a transmission bandwidth consisting of 273 RBs. In Table 1 and Table 2, N/A may be a bandwidth-subcarrier combination not supported by the NR system.

TABLE 1

| Channel Bandwidth (MHz) | SCS | 5 | 10 | 20 | 50 | 80 | 100 |
|---|---|---|---|---|---|---|---|
| Transmission Bandwidth Configuration $N_{RB}$ | 15 kHz | 25 | 52 | 106 | 207 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel Bandwidth (MHz) | SCS | 50 | 100 | 200 | 400 |
|---|---|---|---|---|---|
| Transmission Bandwidth Configuration NRB | 60 kHz | 66 | 132 | 264 | N/A |
| | 120 kHz | 32 | 66 | 132 | 264 |

Hereinafter, throughout the disclosure, a RedCap UE means a UE with reduced function. According to an embodiment, the terminal 110 may be a RedCap UE. A cell supporting a RedCap function means a cell supporting the RedCap UE that satisfies the following conditions.

The maximum bandwidth is 20 MHz for FR1 and 100 MHz for FR2. The UE function and its corresponding capabilities related to a UE bandwidth that is greater than 20 MHz in FR1 or greater than 100 MHz in FR2, are not supported by the RedCap UEs.

Maximum required number of supported DRBs is 8.

Required supporting length of PDCP sequence number (SN) is 12 bits and 18 bits are optional.

Required supporting length of RLC acknowledge mode (AM) SN is 12 bits and 18 bits are optional.

For the FR1, one downlink (DL) multiple input multiple output (MIMO) layer may be supported when one Rx branch is supported, two DL MIMO layers may be supported when two Rx branches are supported, and for the FR2, one or two DL MIMO layers may be supported, and two Rx branches may be always supported. For the FR1 and the FR2, the UE function and its corresponding capabilities related to two or more UE Rx branches or two or more DL MIMO layers, as well as the UE function and its corresponding capabilities related to one or more UE Tx branches or one or more UL MIMO layers, are not supported by the RedCap UE.

The UE functions and their corresponding capabilities related to carrier aggregation (CA), multi-radio access technology-dual connectivity (MR-DC), dual adaptive protocol stack (DAPS), conditional primary and secondary cells (PSCell) change (CPAC), and integrated access and backhaul (IAB) (i.e., the RedCap UE is expected not to operate as an IAB node) are not supported by the RedCap UE.

According to an embodiment, the terminal 110 may identify whether a 5G NR cell supports the RedCap function, based on the system information. The system information may refer to information included in a system information block (SIB) 1 of a corresponding cell. For example, the SIB 1 may include the following information:

RedCap configuration information ('RedCap-Config-CommonSIB'): it may include information (e.g., 'halfDuplexRedCap-Allowed' IE) indicating whether a cell is allowed to support half-duplex frequency division duplexing (FDD), information (e.g., 'cellBarredRedCap1Rx' IE) indicating that a cell is barred for the RedCap UE having one reception branch (i.e., 1Rx branch), and information (e.g., 'cellBarredRedCap2Rx' IE) indicating that a cell is barred for the RedCap UE having two reception branches (i.e., 2Rx branch).

Intra frequency selection information ('intraFreqReselectionRedCap'): it may include information for controlling cell selection/reselection for a cell within a frequency for a RedCap UE, when the cell is barred or processed as being prohibited by the RedCap UE. In case that no information exists, the terminal 110 may treat the cell as being barred. That is, the terminal 110 may deem the corresponding cell as not supporting RedCap.

The terminal 110 may identify whether the 5G NR cell providing the system information supports the RedCap function, based on at least one portion of information included in the system information. For example, when 'intraFreqReselectionRedCap' IE is included in the SIB1, the terminal 110 may identify that the corresponding cell supports the RedCap function. For another example, when it is included the information indicating that a cell is barred for a RedCap UE having a 2Rx branch in the SIB1, the terminal 110 may identify that the corresponding cell does not support the RedCap function.

Figure 4A:
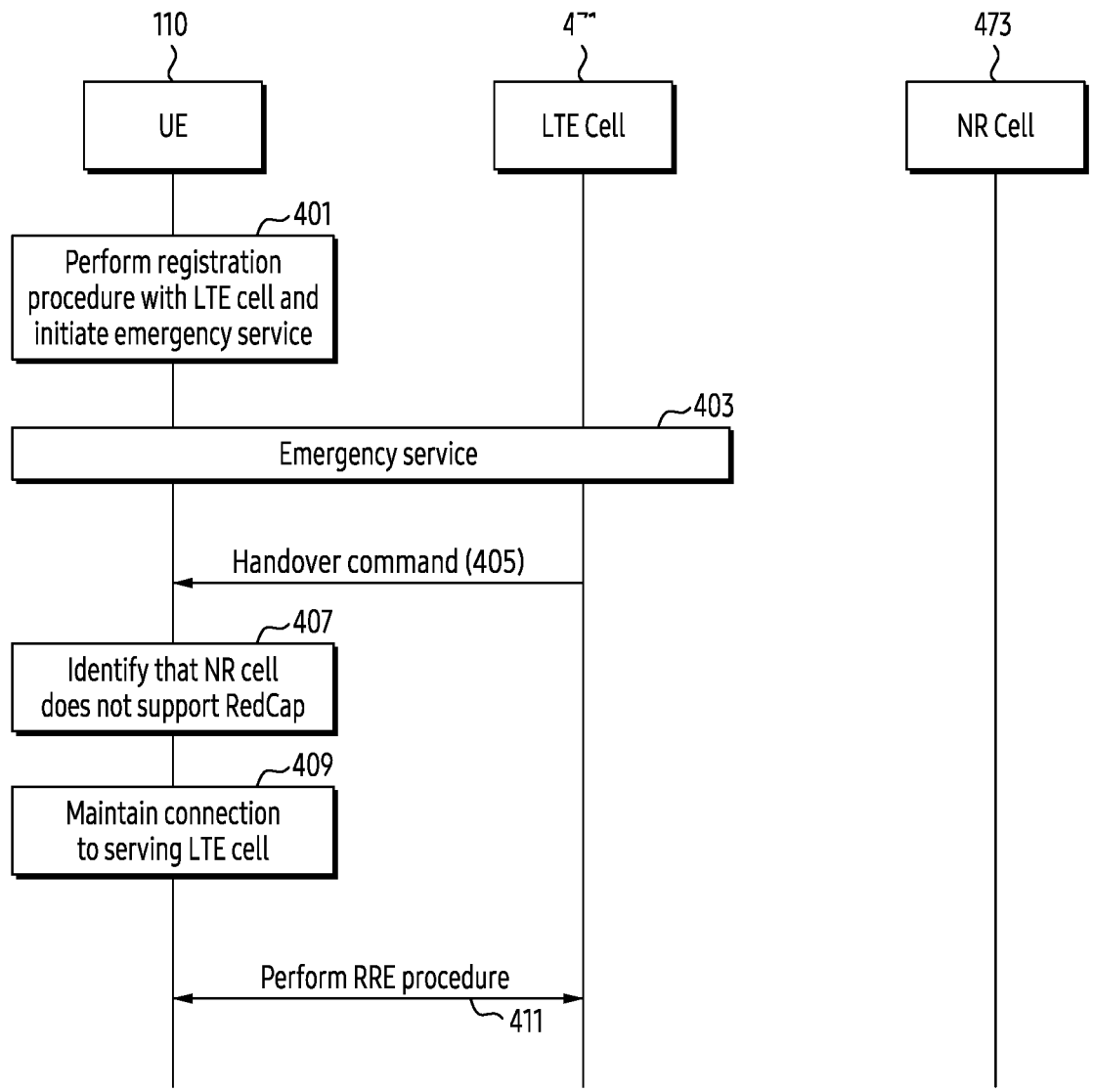
FIGS. 4A and 4B illustrate signal flows for performing an emergency service, upon a handover to an NR cell that does not support a reduced capability (RedCap) function.
Figure 4B:
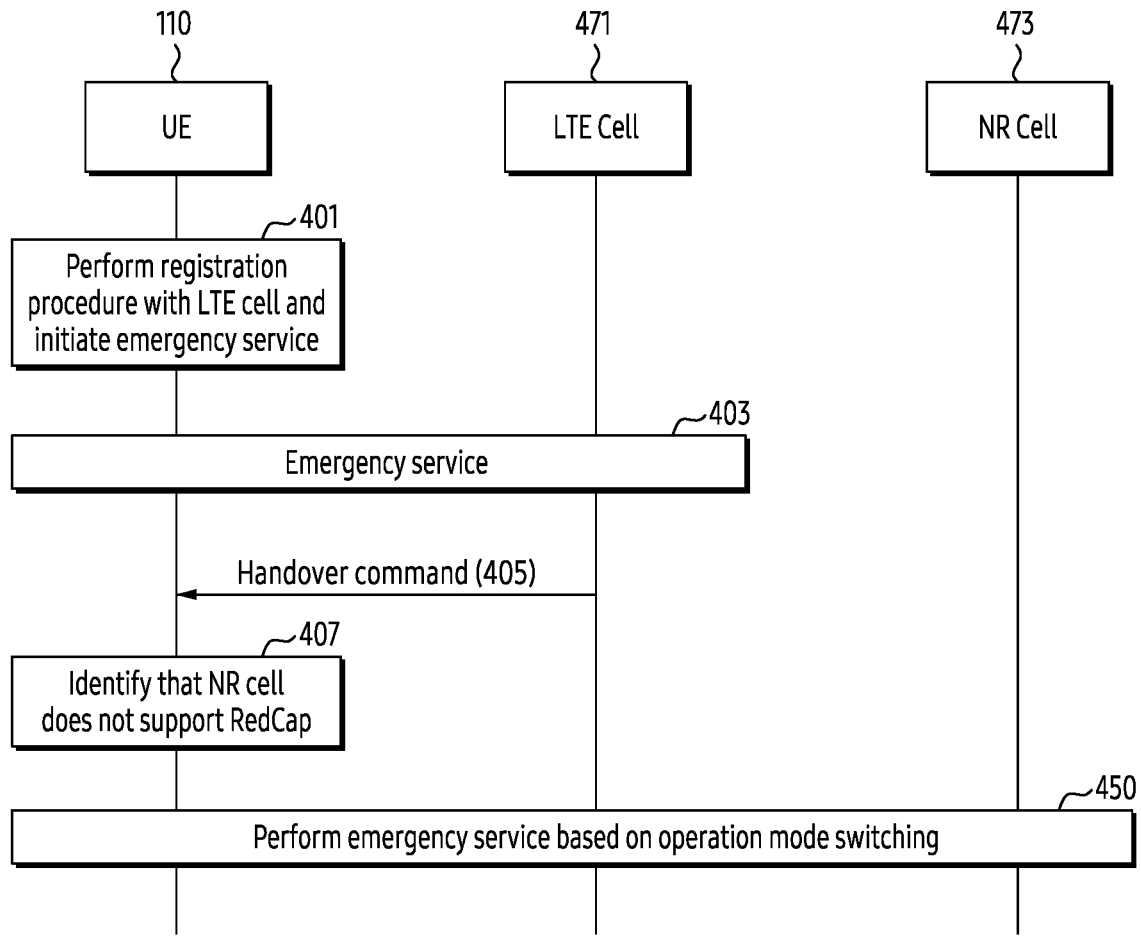

FIGS. 4A and 4B illustrate signal flows for performing an emergency service, when performing a handover to an NR cell not supporting a reduced capability (RedCap) function. Some types of 5G NR cells may support a terminal in an NR normal mode, a terminal in a RedCap mode, or both of a terminal in the NR normal mode and a terminal in the RedCap mode. The type of cell operation mode switching may depend on network installation or cell load balancing information of a specific time or a specific region. The emergency service is one of the services essential to the user. When a user requests an emergency service, the highest priority task should be set for that emergency service and should be performed without any damage or loss. The terminal 110 operating in a 5G RAT may support a legacy mode and a RedCap mode and may be configured to operate in the RedCap mode. In a specific region or at a specific time, the network may cause the terminal 110 to fall back from an NR cell (or may be referred to as 5G cell or 5G NR cell) to an LTE cell. While operating with the RedCap mode in the 5G NR cell, the terminal 110 may receive a movement command (i.e., a handover command) toward the LTE cell.

Referring to FIG. 4A, in operation 401, the terminal 110 may perform a registration procedure with an LTE cell 471 of the base station 120 and initiate an emergency service. The base station 120 may include an eNB. The terminal 110 may perform a random access procedure with the LTE cell 471 of the base station 120. Although not illustrated in FIG. 4A, the base station 120 may perform a registration procedure for the terminal 110 in the LTE cell 471 through signaling with a core network entity (e.g., a mobility management entity (MME)). When the LTE cell 471 is registered, the terminal 110 may establish the emergency service through the LTE cell 471.

In operation 403, the terminal 110 may perform the emergency service on the LTE cell 471 and the base station 120.

In operation 405, the terminal 110 may receive a handover command to the NR cell 473 from the LTE cell 471 of the base station 120. The terminal 110 may receive a handover command to the NR cell 473 while performing the emergency service in the LTE cell 471. The terminal 110 may receive an inter-RAT handover command indicating a target 5G cell from a serving LTE cell 471. The handover command may be transmitted on the LTE cell 471. The handover command may be transmitted through RRC signaling. For example, the terminal 110 may receive an RRC connection reconfiguration message on the 3GPP LTE standard. The RRC connection reconfiguration message may include information indicating a handover command and information indicating a target NR cell (e.g., the NR cell 473).

In operation 407, the terminal 110 may identify that the NR cell 473 does not support RedCap. The terminal 110 may obtain system information on the target cell through the handover command. The target cell may be the NR cell 473. The terminal 110 may identify whether the NR cell 473 supports RedCap, based on the system information about the NR cell 473. According to an embodiment, the system information may be SIB 1 of the NR standard. According to an embodiment, the terminal 110 may identify whether the NR cell 473 supports RedCap, based on at least one of intra frequency selection information (e.g., "intraFreqReselectionRedCap") included in SIB 1 or RedCap configuration information (e.g., information indicating whether a cell supports half-duplex frequency division duplexing (FDD) (e.g., "halfDuplexRedCap-Allowed" IE), information indicating that a cell is barred for a RedCap UE having one reception branch (i.e., a 1Rx branch) (e.g., "cellBarredRedCap1Rx" IE), information indicating that a cell is barred for a RedCap UE having two reception branches (i.e., 2Rx branches) (e.g., 'cellBarredRedCap2Rx' IE)). For example, the terminal 110 may identify that the NR cell 473 is barred, based on at least one of IEs in the RedCap configuration information (e.g., 'cellBarredRedCap1Rx' IE, 'cellBarredRedCap2Rx' IE, or 'halfDuplexRedCap-Allowed' IE). The terminal 110 may identify that the barred NR cell 473 does not support the RedCap function. Further, for example, when there is no intra frequency selection information (e.g., 'intraFreqReselectionRedCap') in the SIB 1, the terminal 110 may identify that the NR cell 473 is barred. The terminal 110 may identify that the barred NR cell 473 does not support the RedCap function.

In operation 409, the terminal 110 may determine to maintain the connection to the serving LTE cell.

In operation 411, the terminal 110 may perform an RRC connection re-establishment (RRE) procedure with the LTE cell 471. According to the current technical standard, when the target 5G cell does not support RedCap, the terminal 110 may perform the RRC procedure to maintain the connection in the serving LTE cell. The terminal 110 may transmit an RRE connection reestablishment request message to the base station 120 on the LTE cell 471. The terminal 110 may receive an RRC connection reestablishment message for the LTE cell 471 from the base station 120. The terminal 110 may transmit an RRC connection reestablishment complete message for the LTE cell 471 to the base station 120. The terminal 110 may perform communication on the LTE cell 471 through a valid RRC connection according to a series of messages. However, the RRE procedure may include a certain time of service disconnection. Further, when the signal quality of the LTE cell 471 deteriorate, higher transmission power is required, and thus, power consumption of the terminal 110 may increase. Afterward, the signal of the LTE cell 471 may get much worse, so that the emergency service may be interrupted and the RRC connection may be disconnected. Frequent recovery procedures may cause signaling overhead for both the UE and the network.

In order to address the above-described problem, the RedCap supporting procedure according to embodiments of the disclosure proposes a scheme for switching an operation mode of the terminal 110 to maintain an emergency service in normal and then, reducing power consumption and signaling overhead of the terminal 110.

Referring to FIG. 4B, in operation 450, the terminal 110 may perform an emergency service based on an operation mode switching. Instead of performing the RRE procedure to the LTE cell 471 of the base station 120, the terminal 110 may perform access to the NR cell 473 of the base station 130, according to the handover command of operation 405. Through the operation mode switching, the terminal 110 may perform access to the NR cell 473. The terminal 110 may change the operation mode of the terminal 110 from the RedCap mode to the NR normal mode. The terminal 110 may perform a connection to the NR cell 473 through a random access procedure. Thereafter, the terminal 110 may perform a registration procedure with the core network entity (e.g., the AMF 235) by means of non-access stratum (NAS) signaling, through the NR cell 473. The AMF 235 may identify and authenticate the terminal 110, and then transmit a response message of accept or reject a registration to the terminal 110, through the NR cell 473. When the registration of the NR cell 473 is completed, the terminal 110 may perform an emergency service on the NR cell 473. Here, the emergency service may be performed in the NR normal mode other than the RedCap mode of the terminal 110. Once the emergency service is terminated, the terminal 110 may change the operation mode from the NR normal mode to the RedCap mode. The terminal 110 may identify the NR cell 473 supporting RedCap and may perform an access procedure to the NR cell 473.

Through the operation mode switching for RedCap according to embodiments, the emergency service can be continuously performed in the LTE cell 471, which is a serving cell, without interruption/loss of the service that may occur due to a bad signal state. In particular, in case where the LTE cell 471 needs to use higher Tx power for packet data transmission, the power consumption of the terminal 110 may be improved. Furthermore, an unnecessary RRE procedure does not occur, and therefore, signaling overhead may be reduced.

Figure 5A:
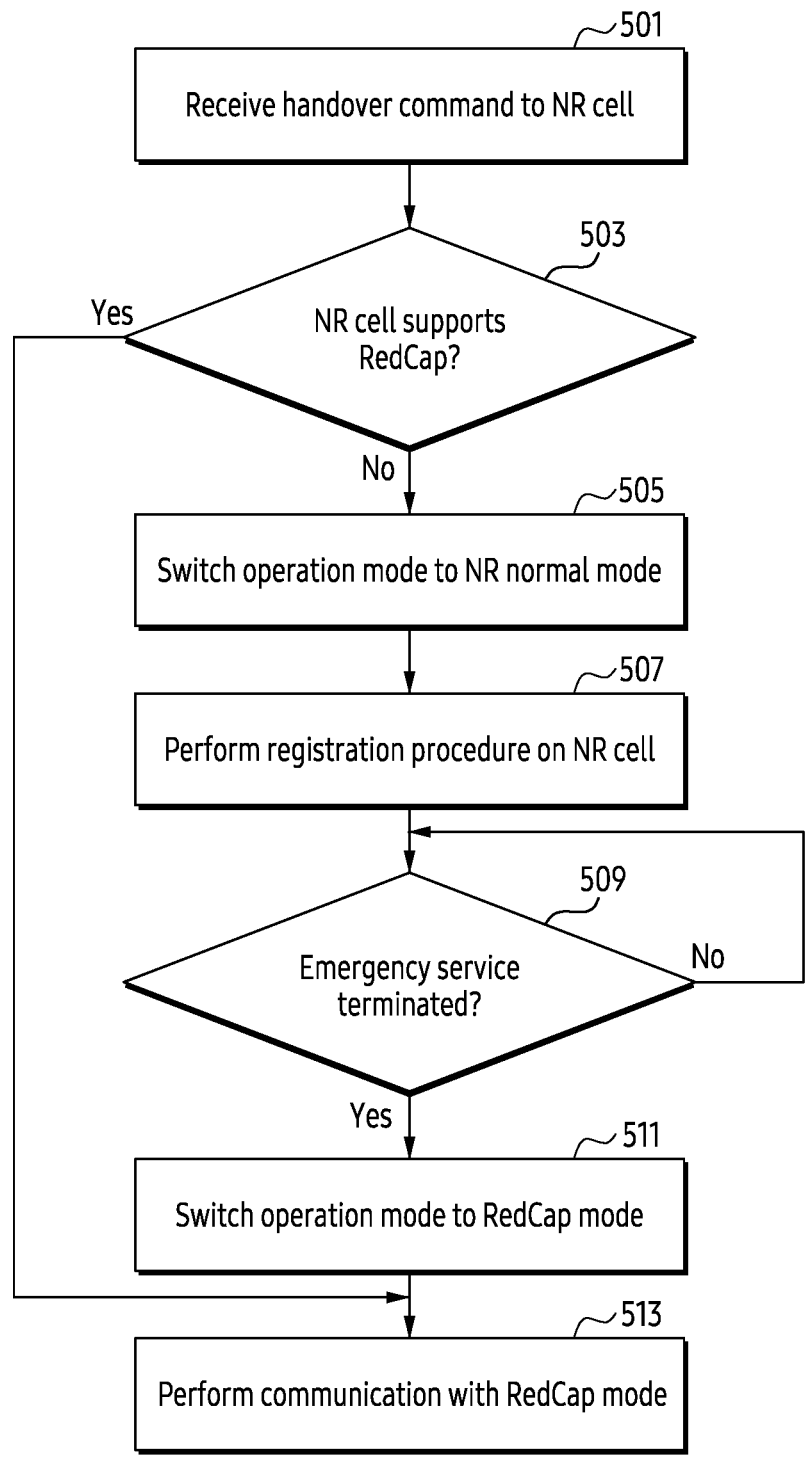
FIG. 5A illustrates an example operation flow of a terminal for operation mode switching.

FIG. 5A illustrates an example of operation flows of a terminal (e.g., the terminal 110) for operation mode switching. Throughout the disclosure, the term 'operation mode' may refer to a state indicating whether the terminal supporting the RedCap function operates in the RedCap mode or in the NR normal mode other than the RedCap mode (i.e., an NR legacy communication scheme other than the RedCap mode).

Referring to FIG. 5A, in operation 501, the terminal 110 may receive a handover command to an NR cell. According to an embodiment, the terminal 110 may receive the handover command while performing an emergency service in the RedCap mode. According to an embodiment, the terminal 110 may receive an RRC reconfiguration message from a serving base station (e.g., the base station 120). The RRC reconfiguration message may include information indicating the NR cell. For example, the serving base station may be an eNB providing an LTE cell.

In operation 503, the terminal 110 may identify whether the NR cell supports RedCap. The terminal 110 may obtain system information on a target cell through the handover command. The target cell may be an NR cell. The terminal 110 may identify whether the NR cell supports RedCap, based on the system information on the NR cell. According to an embodiment, the system information may be SIB 1 of the NR standard. According to an embodiment, the terminal 110 may identify whether the NR cell supports RedCap, based on at least one of the intra frequency selection information (e.g., 'intraFreqReselectionRedCap') included in SIB 1 or the RedCap configuration information (for example, information indicating whether a cell supports half-duplex frequency division duplexing (FDD) (e.g., 'halfDuplexRedCap-Allowed' IE), information indicating that a cell is barred for a RedCap UE having one reception branch (i.e., a 1Rx branch) (e.g., 'cellBarredRedCap1Rx' IE), information indicating that a cell is barred for a RedCap UE having two reception branches (i.e., 2Rx branches) (e.g., 'cellBarredRedCap2Rx' IE)). For example, the terminal 110 may identify that the NR cell is barred, based on at least one of IEs in the RedCap configuration information (e.g., 'cellBarredRedCap1Rx' IE, 'cellBarredRedCap2Rx' IE, or 'halfDuplexRedCap-Allowed' IE). The terminal 110 may identify that the barred NR cell does not support the RedCap function. Further, for example, when there is no intra frequency selection information (e.g., 'intraFreqReselectionRedCap') in the SIB 1, the terminal 110 may identify that the NR cell is barred. The terminal 110 may identify that the barred NR cell does not support the RedCap function.

In case where the NR cell does not support RedCap, the terminal 110 may perform operation 505. In case where the NR cell supports RedCap, the terminal 110 may perform operation 513.

In operation 505, the terminal 110 may switch the operation mode to the NR normal mode. The terminal 110 may access the NR cell to continue the emergency service. However, since the NR cell does not support RedCap, the terminal 110 may switch the operation mode from the RedCap mode to the NR normal mode. The terminal 110 may switch the operation mode to the NR normal mode to access the NR cell.

In operation 507, the terminal 110 may perform a registration procedure on the NR cell. The terminal 110 may perform a random access procedure with the NR cell. The terminal 110 may transmit a random access preamble (RAP) to the base station (e.g., the base station 130) of the NR cell. The terminal 110 may perform the random access procedure using an allocated random access channel (RACH). The terminal 110 may receive a random access response (RAR) from the base station 130. The terminal 110 may transmit an uplink message (e.g., a physical uplink shared channel (PUSCH)) including identity information of the terminal 110 to the base station 130. The terminal 110 may receive a downlink message indicating resolution of competition from the base station 130. The terminal 110 may transmit an RRC connection completion message to the base station 130. Thereafter, when the registration procedure in the core network is completed, the terminal 110 may perform the emergency service on the NR cell. The terminal 110 may perform the emergency service on the NR cell while operating in the NR normal mode.

In operation 509, the terminal 110 may identify whether the emergency service is terminated. When the emergency service is terminated, the terminal 110 may perform operation 511. The terminal 110 may maintain connection with the NR cell, until the emergency service is terminated. The terminal 110 may maintain connection with the NR cell in the NR normal mode, until the emergency service is terminated.

In operation 511, the terminal 110 may switch the operation mode to the RedCap mode. Since the emergency service was terminated, the terminal 110 may determine not to maintain any more connection to the NR cell that does not support the RedCap function. The terminal 110 may switch the operation mode of the terminal 110 from the NR normal mode to the RedCap mode, for power saving in the terminal 110.

In operation 513, the terminal 110 may perform communication with the RedCap mode. The terminal 110 may identify a cell supporting RedCap. According to an embodiment, the terminal 110 may identify a cell supporting RedCap, based on a database storing therein carrier frequencies of cells supporting RedCap. Further, according to an embodiment, the terminal 110 may identify a cell supporting RedCap, based on frequency scanning using a frequency list stored in the terminal 110.

Figure 5B:
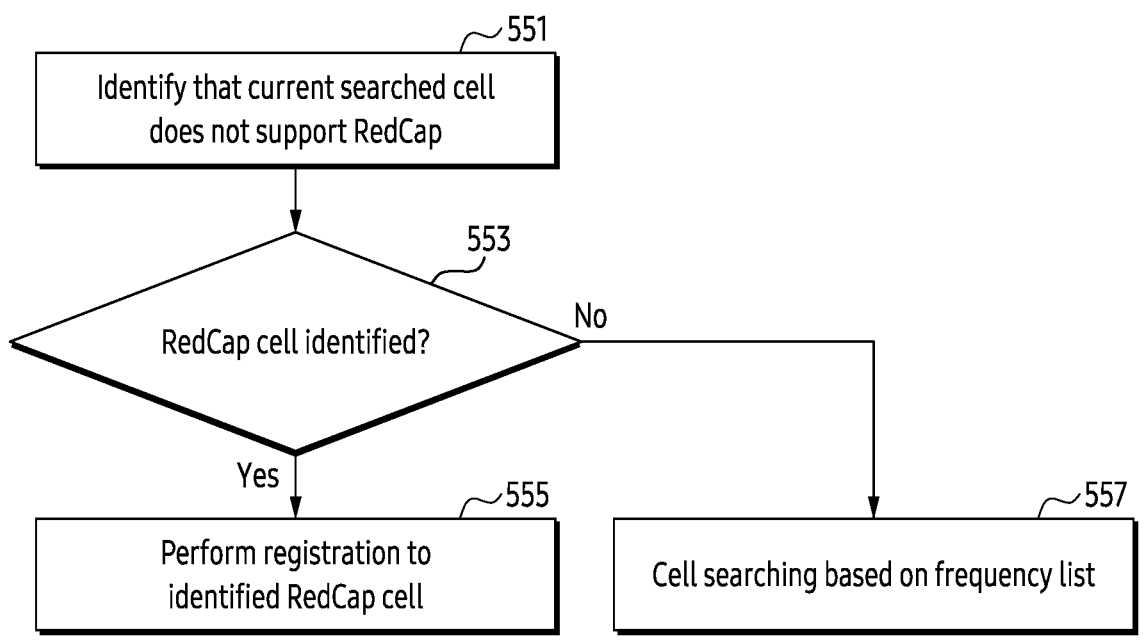
FIG. 5B illustrates an example operation flow of a terminal for performing communication in a RedCap mode.

FIG. 5B illustrates an example operation flow of a terminal (e.g., the terminal 110) for performing communication in the RedCap mode.

Referring to FIG. 5B, in operation 551, the terminal 110 may identify that the current cell does not support the RedCap function. The terminal 110 may identify whether the currently discovered cell supports the RedCap function, based on the system information. According to an embodiment, the terminal 110 may identify whether the discovered cell supports the RedCap function, based on whether a specific IE is included in the system information of the discovered cell. For example, when there is no intra frequency selection information (e.g., 'intraFreqReselectionRedCap') in the SIB 1 message of the discovered cell, the terminal 110 may identify that the discovered cell does not support the RedCap function.

Further, according to an embodiment, the terminal 110 may identify whether the discovered cell supports the RedCap function, based on the capability of the terminal 110 and a specific IE in the system information of the discovered cell. For example, the terminal 110 may identify whether the discovered cell is barred from the terminal 110, based on the information indicating limitation of the number of Rx branches in the SIB 1 message of the discovered cell and the capability of the terminal 110. The terminal 110 may identify that the discovered cell does not support the RedCap function, based on identifying that the discovered cell is barred from the terminal 110.

In operation 553, the terminal 110 may determine whether the RedCap cell is identified. The RedCap cell refers to a cell that supports the RedCap function. The terminal 110 may determine whether the RedCap cell is identified in the database for RedCap. When the RedCap cell is identified, the terminal 110 may perform operation 555. When the RedCap cell is not identified, the terminal 110 may perform operation 557.

In operation 555, the terminal 110 may perform a registration procedure to the identified RedCap cell. The terminal 110 may establish an RRC connection with the RedCap cell by performing a random access procedure on the RedCap cell. Thereafter, when the registration procedure is completed, the terminal 110 may perform a communication service (e.g., an emergency service) through the RRC connection.

In operation 557, the terminal 110 may perform a cell searching based on a frequency list. The frequency list is a frequency list for frequency scanning, and may include one or more frequencies (e.g., NR absolute radio frequency channel number (NR ARFCN)). The terminal 110 may perform a cell searching through the frequency scanning. When the terminal 110 identifies an NR cell supporting the RedCap function through the frequency scanning, the terminal 110 may perform an access procedure (e.g., a random access procedure) with the identified NR cell. The terminal 110 may establish an RRC connection with the NR cell.

Thereafter, when the registration procedure is completed, the terminal 110 may perform a communication service (e.g., an emergency service) through the RRC connection.

Figure 6A:
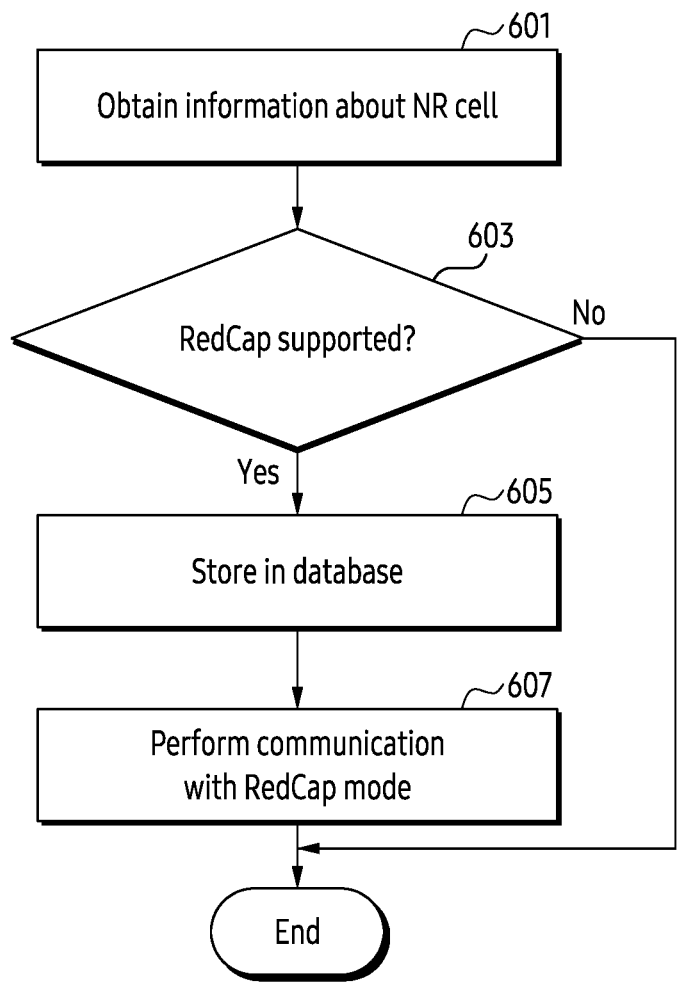
FIGS. 6A and 6B illustrate an example operation flow of a terminal for managing a database for a RedCap mode.
Figure 6B:
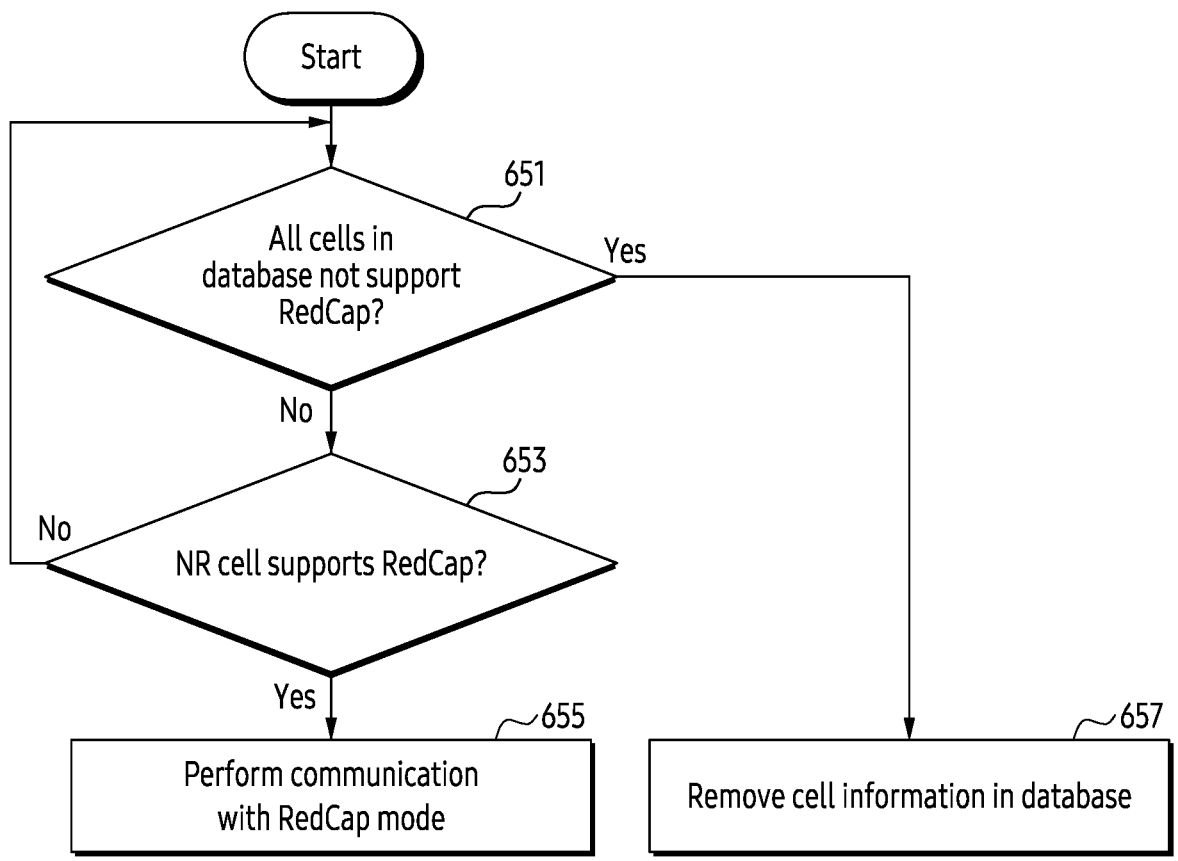

FIGS. 6A and 6B illustrate an example operation flow of a terminal (e.g., the terminal 110) for managing a database for the RedCap mode. The database may store information on a RedCap cell. FIG. 6A illustrates an example of adding a cell supporting a RedCap function to the database, and FIG. 6B illustrates an example of removing a cell stored in the database.

Referring to FIG. 6A, in operation 601, the terminal 110 may obtain information about an NR cell. For example, while the terminal 110 is in searching for a public land mobile network (PLMN), in an idle mode, or in cell selection, in cell reselection, or in handover, the terminal 110 may obtain information on the NR cell. According to an embodiment, the terminal 110 may obtain information about the NR cell through a broadcast message. For example, the terminal 110 may obtain system information about the NR cell in an idle state. Further, according to an embodiment, the terminal 110 may obtain the system information about the NR cell through an RRC message. For example, the terminal 110 may obtain the system information about the NR cell in a connected state. The RRC message indicating a handover command to the NR cell may include the system information on the NR cell.

In operation 603, the terminal 110 may identify whether the NR cell supports RedCap. According to an embodiment, the terminal 110 may identify whether the NR cell supports RedCap, based on the scheme exemplified in the operation 503 (e.g., determining based on whether intra frequency selection information ('intraFreqReselectionRedCap' IE) is included in the SIB 1). When the NR cell does not support the RedCap, the terminal 110 may terminate a storing procedure to the database for RedCap. However, when the NR cell supports RedCap, the terminal 110 may perform operation 605.

In operation 605, the terminal 110 may store the information about the NR cell in the database. In response to determining that the NR cell supports RedCap, the terminal 110 may store the information about the NR cell in the database. According to an embodiment, the terminal 110 may store a tracking area code (TAC) for the NR cell. Further, according to an embodiment, the terminal 110 may store frequency information (e.g., NR ARFCN) of the NR cell. Furthermore, according to an embodiment, the terminal 110 may store a PLMN identifier (ID) for the NR cell. Furthermore, according to an embodiment, the terminal 110 may store a tracking area identifier (TAI) for the NR cell. Still further, according to an embodiment, the terminal 110 may store at least one of the TAC, the frequency information, the PLMN ID, or the TAI, for the NR cell. For example, the database may have the following format.

TABLE 3

| No. | TAC | NR ARFCN |
|---|---|---|
| 1 | 001 | 100000 |
| 2 | 002 | 100001 |
| ... | ... | ... |

In operation 607, the terminal 110 may perform communication with the RedCap mode. The terminal 110 may perform communication according to the RedCap mode on the NR cell. This is because the NR cell supports RedCap. The terminal 110 may fall back to the LTE cell, while the terminal 110 performs communication with the RedCap mode. According to an embodiment, the terminal 110 may perform the operations of FIG. 5A, while performing communication with the RedCap mode on the LTE cell.

Referring to FIG. 6B, in operation 651, the terminal 110 may identify whether all cells in the database do not support RedCap. The database may refer to a storage configured to store cells supporting the RedCap function. When at least one cell in the database supports RedCap, the terminal 110 may perform operation 653. When none of the cells in the database supports RedCap, the terminal 110 may perform operation 657.

In operation 653, the terminal 110 may identify whether the NR cell supports RedCap. The terminal 110 may identify the NR cell in the database. When the NR cell supports RedCap, the terminal 110 may perform operation 655. When the NR cell does not support RedCap, the terminal 110 may perform operation 657.

In operation 655, the terminal 110 may perform communication with the RedCap mode. The terminal 110 may communicate with the RedCap mode on the NR cell.

In operation 657, the terminal 110 may remove cell information in the database. Since the NR cell identified in the database no more supports the RedCap mode, the terminal 110 may remove the cell information corresponding to the NR cell. For example, the terminal 110 may remove the set of ARFCN and TAC from the database, in response to determining that all cells scanned by the ARFCNs selected from the database do not support RedCap.

In FIG. 6B, evaluation is performed of only one cell in the database for RedCap, but the embodiments of the disclosure are not limited thereto. In response to determining that the cell does not support RedCap while the UE is searching for PLMN, in an idle mode, in cell selection, in cell reselection, or performing a handover, the terminal 110 may perform a cell evaluation on a next candidate cell.

Figure 7A:
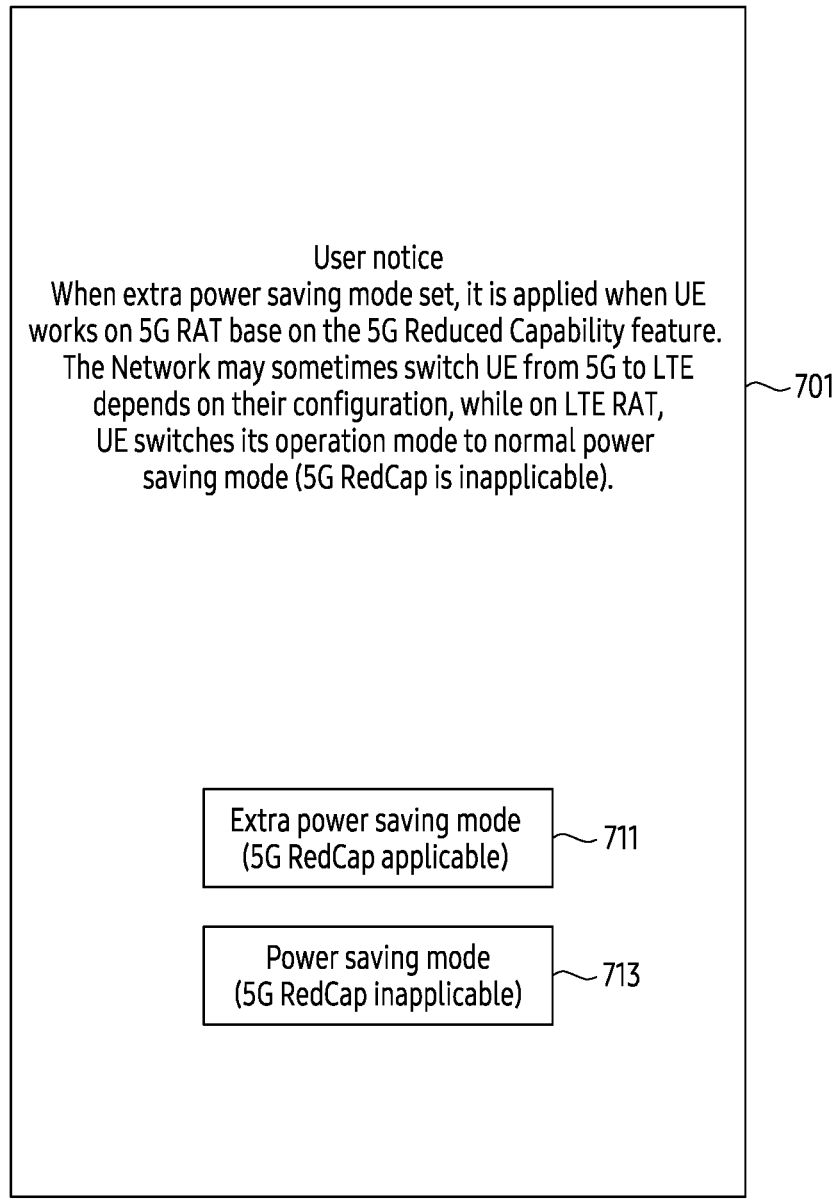
FIG. 7A illustrates an example of a screen of a terminal for an extra power saving mode using a RedCap function.

FIG. 7A illustrates an example of a screen of a terminal (e.g., the terminal 110) for an extra power saving mode using the RedCap function.

Referring to FIG. 7A, the terminal 110 may provide a user with guidance of a power saving mode (or referred to as 'low power mode') through a display of the terminal 110. The display of the terminal 110 may display a screen 701. The terminal 110 may display a visual object 711 for an extra power saving mode and a visual object 713 for a normal power saving mode, together with a user notice message guiding that such an extra power saving mode is available, on the screen 701 of the display. The user notice message may read "When extra power saving mode is set, the extra saving mode is applied when UE works on 5G RAT based on the 5G Reduced Capability feature. The network may sometimes switch UE from 5G to LTE depending on their configuration, while on LTE RAT, UE switches its operation mode to normal power saving mode (5G RedCap is not applicable)." According to an embodiment, the extra power saving mode may indicate that the RedCap function is supported in the 5G NR cell. According to an embodiment, the normal power saving mode may indicate that the RedCap function is not used in the 5G NR cell.

Figure 7B:
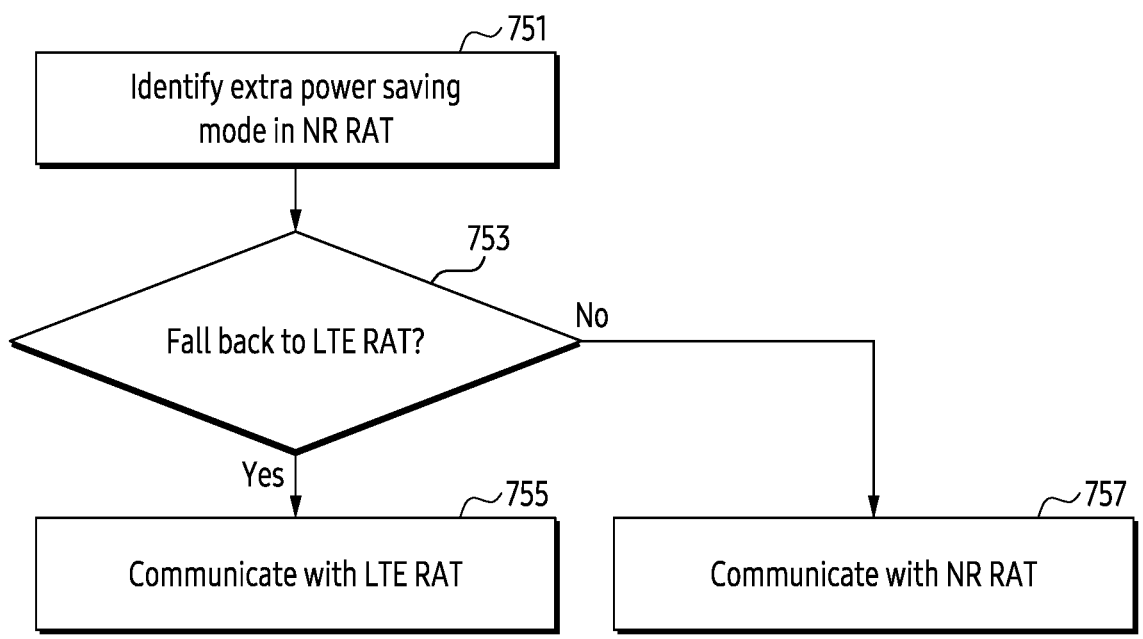
FIG. 7B illustrates an example operation flow of a terminal for identifying a radio access technology (RAT) according to an extra power saving mode.

FIG. 7B illustrates an example operation flow of a terminal (e.g., the terminal 110) for identifying a radio access technology (RAT) according to an extra power saving mode. The radio access technology (RAT) refers to a communication method between the terminal 110 and a cell of a base station (e.g., the base station 120 or the base station 130).

Referring to FIG. 7B, in operation 751, the terminal 110 may identify an extra power saving mode in the NR RAT.

Unlike the normal power saving mode, the extra power saving mode requires the terminal 110 to operate in the NR RAT. In other words, the extra power saving mode may require that the terminal 110 is in connection with the NR cell. Since the RedCap function defined in the 5G NR standard has to be supported in the extra power saving mode, the terminal 110 may identify the extra power saving mode in the NR RAT.

In operation 753, the terminal 110 may determine whether to fall back to the LTE RAT. When such a fallback to the LTE RAT is determined, the terminal 110 may perform operation 755. When no fallback to the LTE RAT is determined, the terminal 110 may perform operation 757.

In operation 755, the terminal 110 may communicate with the LTE RAT. When the user selects the extra power saving mode (e.g., when a user input is received on the visual object 711 in FIG. 7A), the terminal 110 may switch the operation mode from the NR normal mode to the RedCap mode. Then, when a mobility command for the LTE RAT is received from the network, the terminal 110 may perform a registration procedure in the LTE cell. In such a circumstance, the terminal 110 may store the RedCap mode. Further, when returning to the 5G NR cell, the terminal 110 may store information on the NR cell for the NR RAT for recovery.

In operation 757, the terminal 110 may communicate with the NR RAT.

Figure 8:
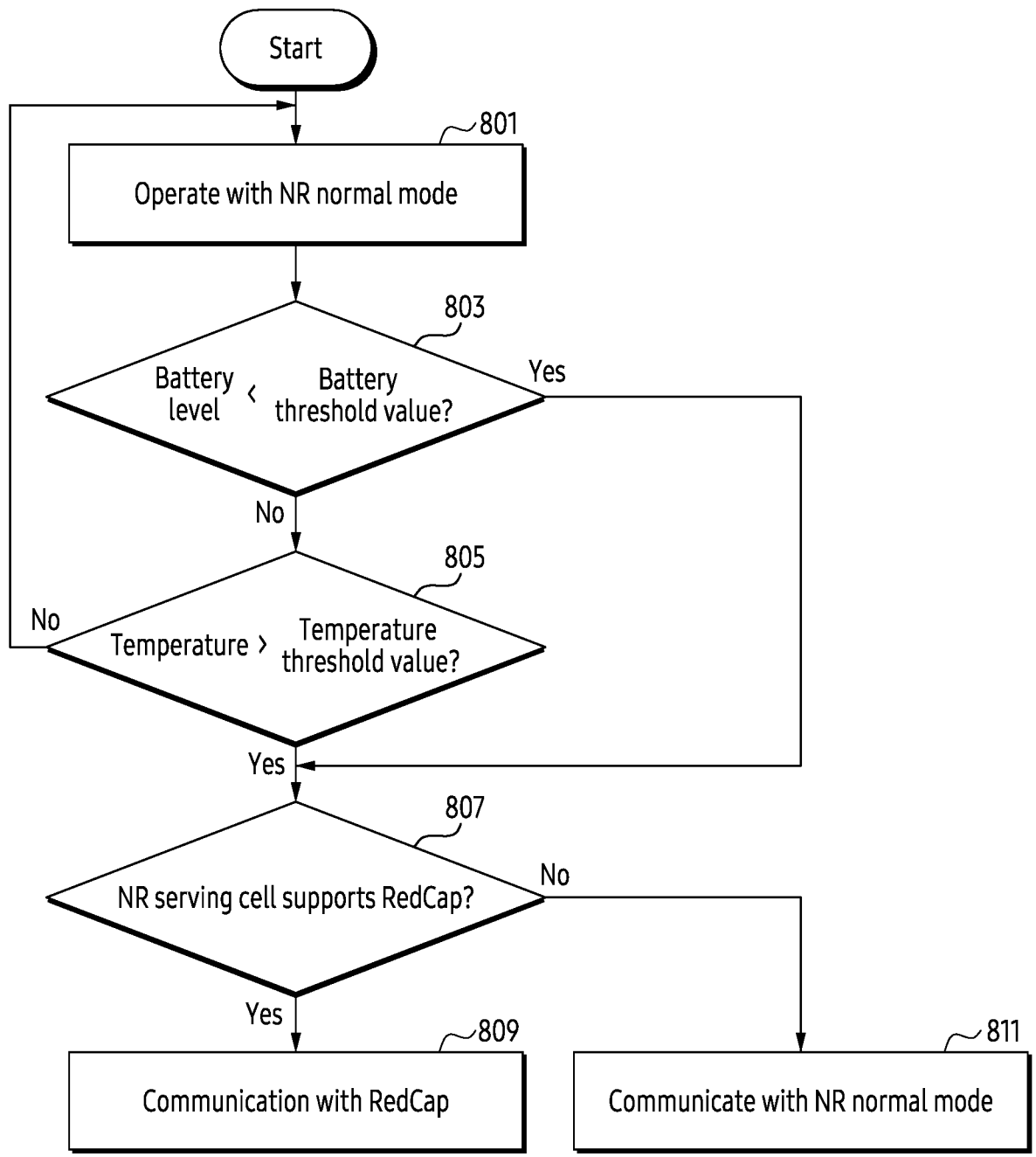
FIG. 8 illustrates an example operation flow of a terminal for switching to a RedCap mode.

FIG. 8 illustrates an example operation flow of a terminal (e.g., the terminal 110) for switching to the RedCap mode. The RedCap mode refers to an operation mode for providing power saving of the terminal 110 by specifying requirements in the NR standard. For example, in the RedCap mode, the maximum bandwidth of the terminal 110, the number of transmit antennas of the terminal 110, and the number of receive antennas of the terminal 110 may be limited. In FIG. 8, description is made of the conditions for automatically switching to the RedCap mode.

Referring to FIG. 8, in operation 801, the terminal 110 may operate with the NR normal mode. The terminal 110 may be in access to an NR cell which use a 5G communication scheme. The terminal 110 may communicate with the NR cell in an operation mode other than the RedCap mode, that is, an NR normal mode.

In operation 803, the terminal 110 may identify whether a battery level of the terminal 110 is less than a battery threshold value. When the battery level of the terminal 110 is less than the battery threshold value, the terminal 110 may perform operation 807. When the battery level of the terminal 110 is greater than the battery threshold value, the terminal 110 may perform operation 805.

In operation 805, the terminal 110 may identify whether the temperature of the terminal 110 is greater than a temperature threshold value. When the temperature of the terminal 110 is greater than the temperature threshold value, the terminal 110 may perform operation 807. When the temperature of the terminal 110 is less than the temperature threshold value, the terminal 110 may perform operation 801.

In operation 807, the terminal 110 may identify whether an NR serving cell supports RedCap. According to an embodiment, the terminal 110 may identify whether the NR serving cell supports RedCap, based on the method exemplified in the operation 503 (for example, determination based on whether the intra frequency selection information ('intraFreqReselectionRedCap' IE) is included in the SIB 1). When the NR serving cell supports RedCap, the terminal 110 may perform operation 809, while when the NR serving cell does not support RedCap, the terminal 110 may perform operation 811.

In operation 809, the terminal 110 may communicate with the RedCap mode.

In operation 811, the terminal 110 may communicate with the NR normal mode.

In FIG. 8, the battery level condition, the temperature condition, and the RedCap support condition are described in sequence, but the embodiments of the disclosure are not limited thereto. According to an embodiment, the terminal 110 may not perform operation 805. The terminal 110 may immediately perform operation 807 without determining the temperature condition. According to another embodiment, the terminal 110 may not perform operation 803. The terminal 110 may identify whether the temperature level condition according to operation 805 is satisfied, without determining the battery level condition.

Figure 9:
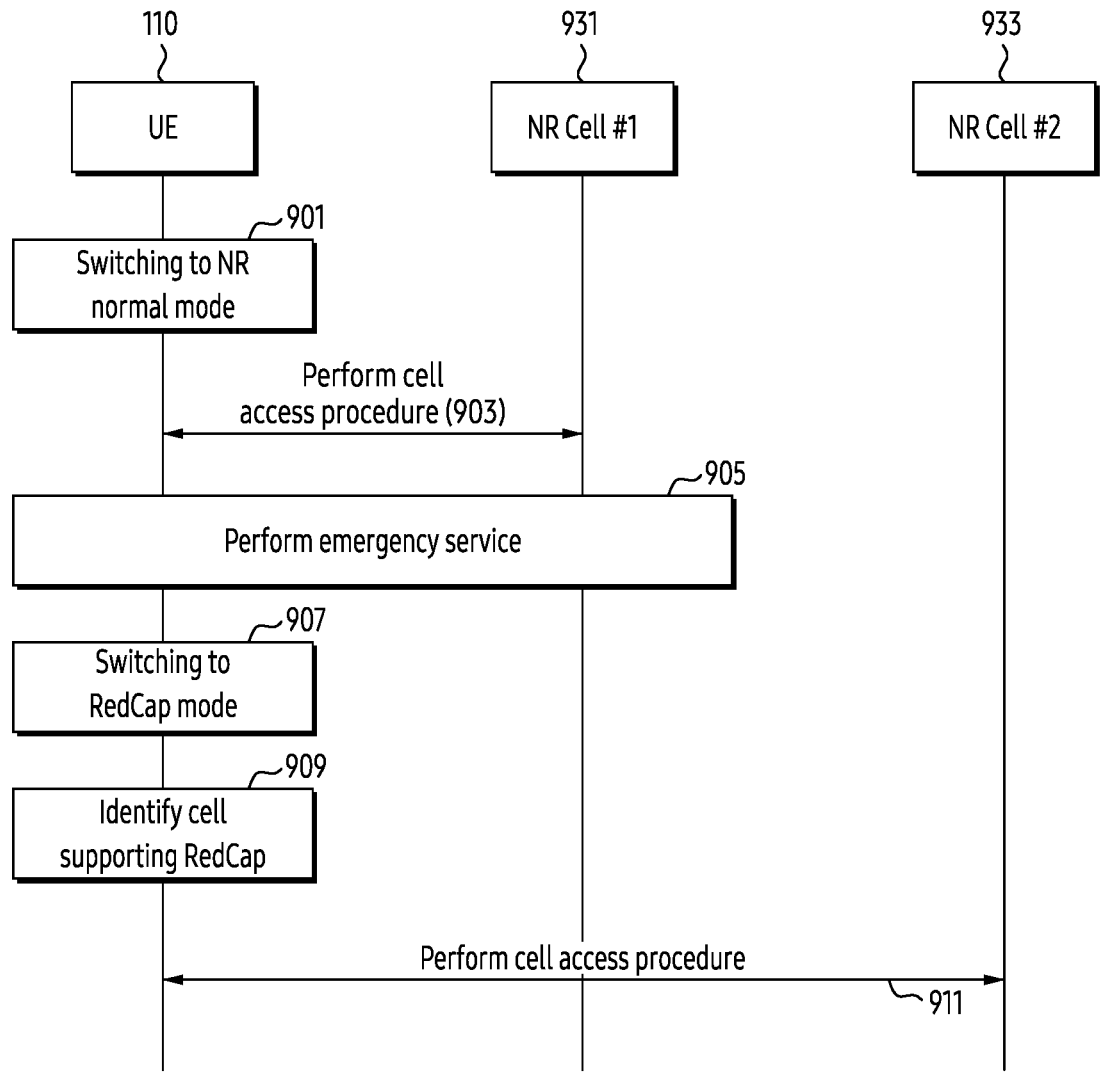
FIG. 9 illustrates signal flows for performing an emergency service based on an operation mode switching.

FIG. 9 illustrates signal flows for performing an emergency service based on operation mode switching. Operations of FIG. 9 may correspond to the operation 450 of FIG. 4B.

Referring to FIG. 9, in operation 901, the terminal 110 may switch the operation mode to the NR normal mode. The operation mode of the terminal 110 may be changed from the RedCap mode to the NR normal mode.

In operation 903, the terminal 110 may perform a cell access procedure. The terminal 110 may perform an access procedure (e.g., a random access procedure) to an NR cell (hereinafter, NR cell #1(931)) that does not support the RedCap function. The terminal 110 may perform an access procedure to the NR cell #1(931) to continue the ongoing emergency service. For example, the NR cell #1(931) may correspond to the NR cell 473 of FIG. 4B.

In operation 905, the terminal 110 may perform the emergency service. The terminal 110 may perform the emergency service on the NR cell #1(931) in the NR normal mode.

In operation 907, the terminal 110 may switch the operation mode to the RedCap mode. The terminal 110 may perform communication with the NR normal mode on the NR cell #1(931), until the emergency service is terminated. The terminal 110 may identify that the emergency service is terminated. The terminal 110 may perform switching of the operation mode, in response to identifying that the emergency service is terminated. The operation mode of the terminal 110 may be changed from the NR normal mode to the RedCap mode.

In operation 909, the terminal 110 may identify a cell supporting RedCap. For example, the terminal 110 may identify NR cell #2 (933). According to an embodiment, the terminal 110 may identify the cell (e.g., NR cell #2 (933)) supporting RedCap, based on a database storing carrier frequencies of cells supporting RedCap. Further, according to an embodiment, the terminal 110 may identify the cell (e.g., NR cell #2 (933)) supporting RedCap, based on frequency scanning using a frequency list stored in the terminal 110. In the frequency scanning, it may determine whether each cell supports RedCap, based on system information of the corresponding cell.

In operation 911, the terminal 110 may perform a cell access procedure. The terminal 110 may perform an access procedure to the NR cell #2 (933) supporting the RedCap. The terminal 110 may communicate with the RedCap mode on the NR cell #2 (933). According to an embodiment, the terminal 110 may again perform the access procedure to the NR cell #2 (933) through either a cell selection or a cell reselection. According to another embodiment, the terminal 110 may transmit a measurement report to the NR cell #1 (931) which is the current serving cell. Then, it may perform an access to the NR cell #2 (933) by receiving a handover command to the NR cell #2 (933) from the base station of the NR cell #1 (931).

Although FIG. 9 illustrates the NR cell #1 (931) and the NR cell #2 (933), respectively, the embodiments of the disclosure are not limited thereto, according to methods of implementation thereof. According to an embodiment, the two cells may be provided by the same base station (e.g., the base station 130). Alternatively, according to another embodiment, the NR cell #1 (931) may be provided by the first gNB, and the NR cell #2 (933) may be provided by the second gNB.

Figure 10:
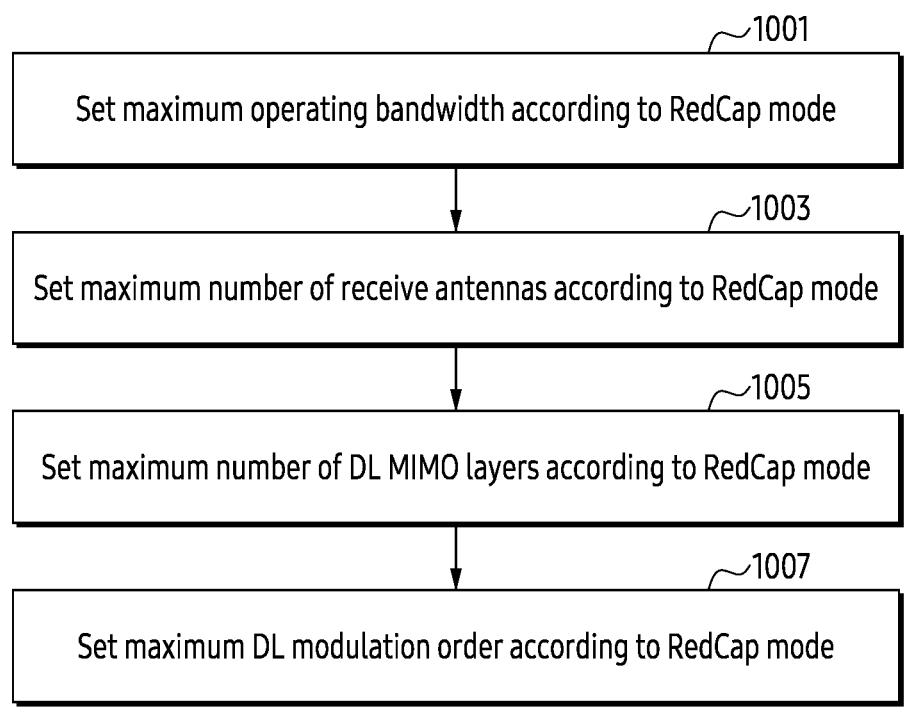
FIG. 10 illustrates an example operation flow of a terminal for setting a RedCap mode.

FIG. 10 illustrates an example operation flow of a terminal (e.g., the terminal 110) for configuring a RedCap mode. The RedCap mode may require limitation of parameters of the physical layer of the terminal 110. As the operation mode of the terminal 110 is changed, one or more parameters for the terminal 110 may be changed.

Referring to FIG. 10, in operation 1001, the terminal 110 may set the maximum operating bandwidth according to the RedCap mode. For example, the frequency band of the current serving cell operating with the RedCap mode may belong to FR 1 of NR. According to an embodiment, the terminal 110 may set the maximum operating bandwidth for the terminal 110 to 20 MHz, in the FR 1. For another example, the frequency band of the current serving cell operating with the RedCap mode may belong to FR 2 of NR. According to an embodiment, the terminal 110 may set the maximum operating bandwidth for the terminal 110 to 100 MHz, in the FR 2.

In operation 1003, the terminal 110 may set the maximum number of receive antennas according to the RedCap mode. The maximum number of receive antennas may depend on a frequency band. For example, the frequency band of the current serving cell operating with the RedCap mode may belong to FR 1 of NR. According to an embodiment, in FR 1, the terminal 110 may set the maximum number of receive antennas for the terminal 110 to 1 or 2. For another example, the frequency band of the current serving cell operating with the RedCap mode may belong to FR 2 of NR. According to an embodiment, the terminal 110 may set the maximum number of receive antennas for the terminal 110 to 1, in the FR 2.

In operation 1005, the terminal 110 may set the maximum number of downlink (DL) MIMO layers according to the RedCap mode. The maximum number of receive antennas may depend on a frequency band. For example, the frequency band of the current serving cell operating with the RedCap mode may belong to FR 1 of NR. According to an embodiment, in the FR 1, the terminal 110 may set the maximum number of DL MIMO layers for the terminal 110 to 1 or 2. For another example, the frequency band of the current serving cell operating with the RedCap mode may belong to FR 2 of NR. According to an embodiment, in FR 2, the terminal 110 may set the maximum number of DL MIMO layers for the terminal 110 to 1.

In operation 1007, the terminal 110 may set the maximum DL modulation order according to the RedCap mode. For example, the frequency band of the current serving cell operating with the RedCap mode may belong to FR 1 of NR. According to an embodiment, in the FR 1, the terminal 110 may set the maximum DL modulation order for the terminal 110 to 64 QAM (Quadrature Amplitude Modulation). For another example, the frequency band of the current serving cell operating with the RedCap mode may belong to FR 2 of NR. According to an embodiment, in the FR 2, the terminal 110 may set the maximum DL modulation order for the terminal 110 to 64 QAM.

In FIG. 10, settings for the RedCap mode of the terminal 110 are sequentially illustrated, but the embodiments of the disclosure are not limited thereto. According to an embodiment, the operation 1003 and the operation 1005 may be performed before the operation 1001. According to another embodiment, the operation 1007 may be performed before the operation 1005. According to another embodiment, at least one of the operations may be omitted.

The conditions shown in FIG. 10 may be defined as shown in the following table. According to an embodiment, the terminal 110 may set a limit for at least one of the above conditions.

TABLE 4

|  | FR1 | | FR2 | |
| --- | --- | --- | --- | --- |
|  | Bassline device | RedCap device | Bassline device | RedCap device |
| Maximum device bandwidth | 100 MHz | 20 MHz | 200 MHz | 100 MHz |
| Minimum number of device receive branches | 2 or 4, depending on the frequency bend | 1 for bands where a baseline NR device is required to have 2 TBD: 1 or 2 for bands where a baseline NR device is required to have 4 | 2 | 1 |
| Minimum number of downlink MIMO layers | 2 or 4, depending on the frequency bend | 1 for RedCap device with 1 Rx branch; 2 for RedCap device with 2 Rx branches | 2 | 1 |
| Maximum downlink modulation order | 256 QAM | 64 QAM | 64 QAM | 64 QAM |
| Duplex operation | FD-FDD, TDD | UE may implement HD-FDD, FD-FDD, TDD | TDD | TDD |

Figure 11:
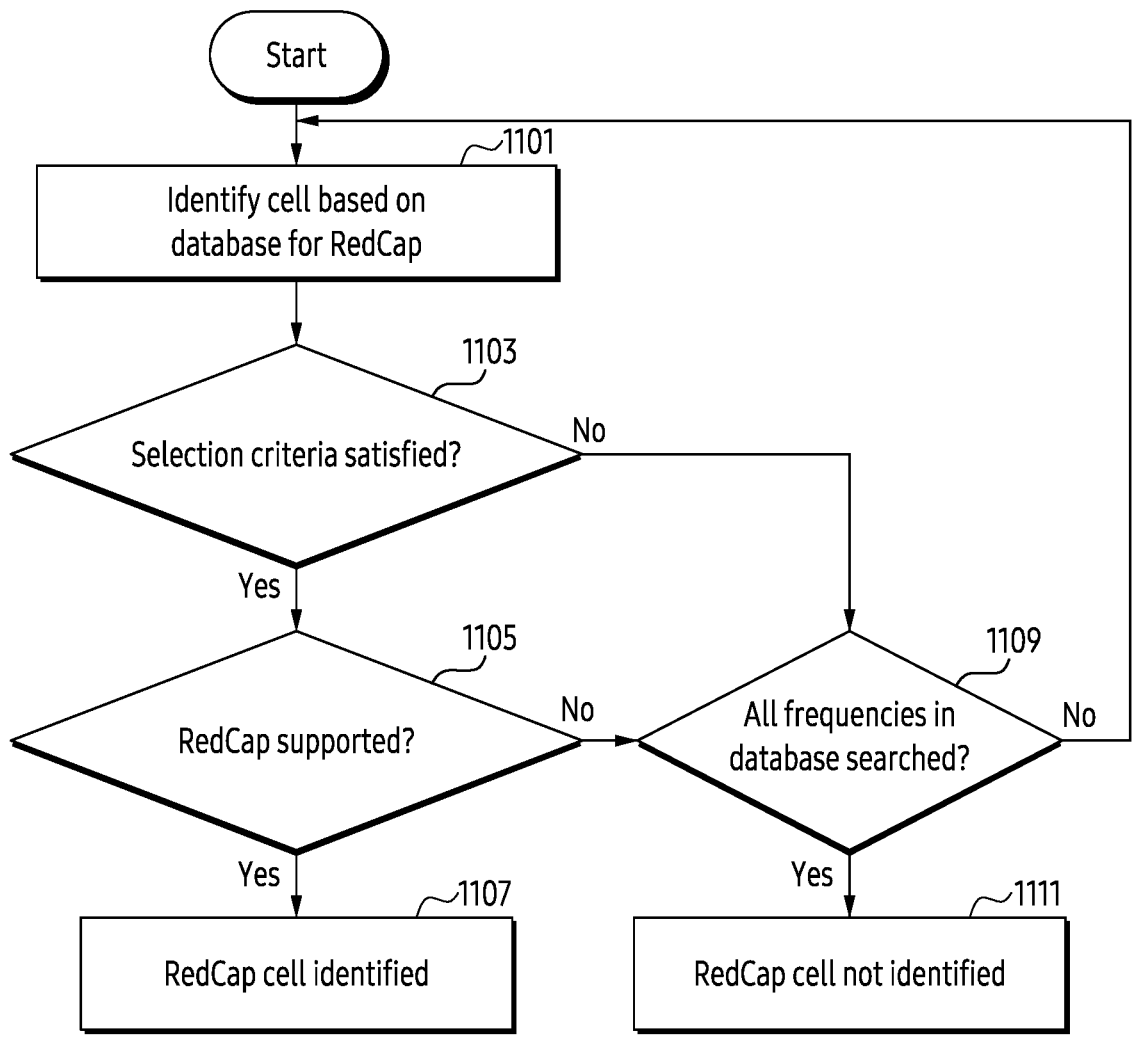
FIG. 11 illustrates an example operation flow of a terminal for identifying a cell supporting a RedCap function.

FIG. 11 illustrates an example operation flow of a terminal (e.g., the terminal 110) for identifying a cell supporting the RedCap function.

Referring to FIG. 11, in operation 1101, the terminal 110 may identify a cell based on a database for RedCap. The cell may be an NR cell. The database may store information on a RedCap cell. For example, the database may have a format as shown in Table 3.

In operation 1103, the terminal 110 may identify whether the identified NR cell meets designated selection criteria. For example, the selection criterion may include a condition for a receive level value (in a unit of decibel (dB)) for the identified NR cell and a condition for a cell selection quality value (in a unit of dB). For example, when the receive level value is greater than zero and the cell selection quality value is greater than zero, the terminal 110 may identify that the selection criterion for the identified NR cell is satisfied.

When the identified NR cell satisfy the selection criterion, the terminal 110 may perform operation 1105. When the identified NR cell does not satisfy the selection criterion, the terminal 110 may perform operation 1109.

In operation 1105, the terminal 110 may identify whether the identified NR cell supports RedCap. Since the identified NR cell meets the cell selection criterion, the terminal 110 may decode a master information block (MIB) and the SIB 1 for the NR cell. The terminal 110 may identify whether the identified NR cell supports RedCap, based on a result of decoding the SIB 1. According to an embodiment, the terminal 110 may identify whether the NR cell supports RedCap, based on at least one of the intra frequency selection information (e.g., 'intraFreqReselectionRedCap') included in SIB 1 or the RedCap configuration information (for example, information (e.g., 'halfDuplexRedCap-Allowed' IE) indicating whether a cell supports half-duplex frequency division duplexing (FDD), information (e.g., 'cellBarredRedCap1Rx' IE) indicating that a cell is barred for a RedCap UE having one reception branch (i.e., a 1Rx branch), information (e.g., 'cellBarredRedCap2Rx' IE) indicating that a cell is barred for a RedCap UE having two reception branches (i.e., 2Rx branches)). For example, the terminal 110 may identify that the NR cell is barred, based on at least one of IEs in the RedCap configuration information (for example, 'cellBarredRedCap1Rx' IE, 'cellBarredRedCap2Rx' IE, or 'halfDuplexRedCap-Allowed' IE). The terminal 110 may identify that the barred NR cell does not support the RedCap function. Further, for example, when there is no intra frequency selection information (e.g., 'intraFreqReselectionRedCap') in the SIB 1, the terminal 110 may identify that the NR cell is barred. The terminal 110 may identify that the barred NR cell does not support the RedCap function.

In case where the identified cell supports RedCap, the terminal 110 may perform operation 1107. In case where the identified cell does not support RedCap, the terminal 110 may perform operation 1109.

In operation 1107, the terminal 110 may determine that the RedCap cell is identified. The RedCap cell may refer to a 5G NR cell supporting the RedCap function. The terminal 110 may perform a cell discovery procedure using a frequency belonging to the TAC serviced in the database, and identify a RedCap cell based on the cell discovery procedure.

In operation 1109, the terminal 110 may determine whether all frequency searches in the database have been performed. In case where all frequency searches in the database have been performed, the terminal 110 may perform operation 1111. When all frequency searches in the database have not been performed, the terminal 110 may perform operation 1101 again.

In operation 1111, the terminal 110 may determine that the RedCap cell is not identified. When the search for all frequencies is completed and the RedCap cell is not identified, the terminal 110 may identify the frequency list stored for the cell search. Then, the terminal 110 may search for the RedCap cell again, through frequency scanning for frequencies in the frequency list.

Referring to FIGS. 1, 2A, 2B, 3, 4A, 4B, 5A, 5B, 6A, 6B, 7A, 7B, and 8 to 11, description has been mainly made of a situation in which a handover command to an NR cell is received while the terminal 110 performs an emergency service in an LTE cell. However, the embodiments of the disclosure are not limited thereto. If the terminal 110 operating with the RedCap mode needs to access a cell that does not support RedCap of the NR while performing the emergency service, use may be made of the operation mode switching according to the embodiments of the disclosure. Hereinafter, with reference to FIGS. 12A and 12B, description will be made of other situations in which it is necessary to access a cell that does not support RedCap of the NR other than handover.

Figure 12A:
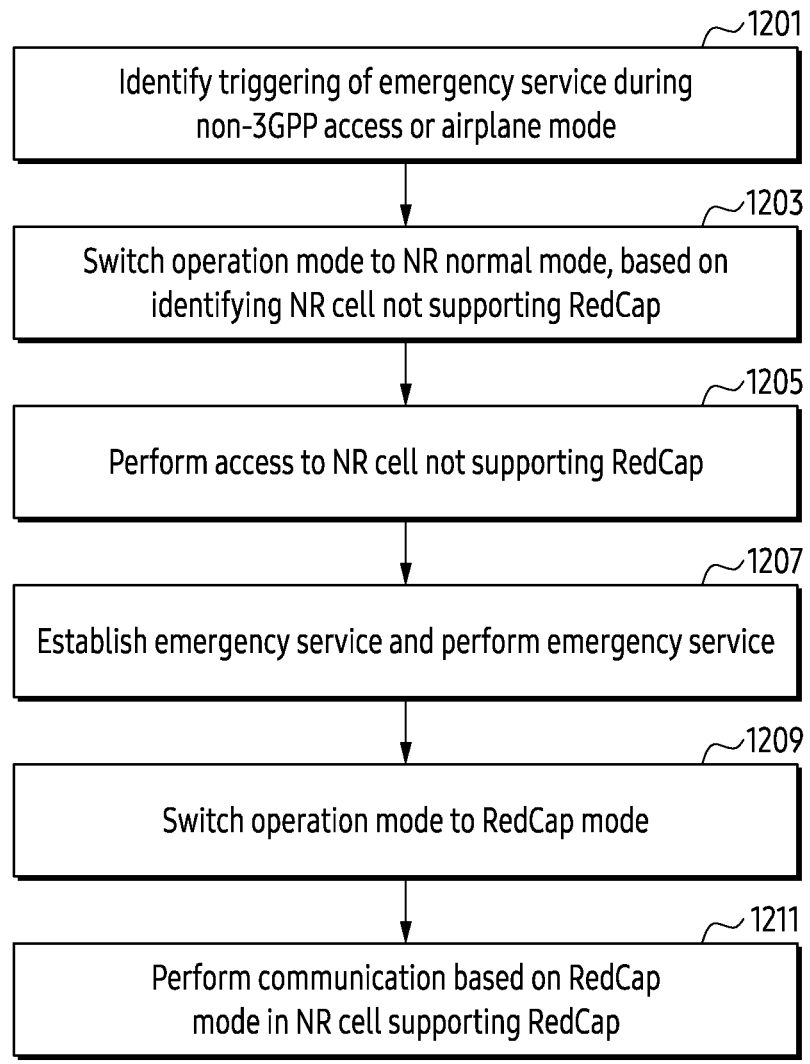
FIG. 12A illustrates an example operation flow of a terminal for performing an emergency service in a non-3GPP access or airplane mode.

FIG. 12A illustrates an example operation flow of a terminal (e.g., the terminal 110) for performing an emergency service in a non-3GPP access or airplane mode.

Referring to FIG. 12A, in operation 1201, the terminal 110 may identify triggering of an emergency service during a non-3GPP access or airplane mode. The terminal 110 may identify that the emergency service is triggered during the non-3GPP access or airplane mode. The terminal 110 may perform cell searching to perform the emergency service.

In operation 1203, the terminal 110 may switch the operation mode to the NR normal mode, based on identifying an NR cell that does not support RedCap. The terminal 110 may identify an NR cell that does not support RedCap. The terminal 110 may identify that the NR cell does not support RedCap, based on system information of the NR cell. Although the terminal 110 supports the RedCap mode, the terminal 110 may change the priority operation mode to perform the emergency service on the NR cell.

In operation 1205, the terminal 110 may perform access to the NR cell that does not support RedCap. The terminal 110 may perform a random access procedure with a base station providing the NR cell. The terminal 110 may perform a registration procedure for the NR cell through NAS signaling with a core network entity (e.g., AMF).

In operation 1207, the terminal 110 may establish an emergency service and perform the emergency service. Unlike the previous handover, the terminal 110 may be unable to establish the emergency service before accessing the NR cell, since it has no valid RRC connection such as an LTE cell. The terminal 110 may establish the triggered emergency service after accessing the NR cell. After establishing the emergency service, the terminal 110 may perform the emergency service on the NR cell. In this occasion, the operation mode of the terminal 110 may be an NR normal mode.

In operation 1209, the terminal 110 may switch the operation mode to the RedCap mode. The terminal 110 may operate with the NR normal mode until the emergency service is terminated. When the emergency service is terminated, the terminal 110 may change the operation mode. When the emergency service is terminated, the terminal 110 may again switch to the RedCap mode to save power.

In operation 1211, the terminal 110 may perform communication based on the RedCap mode in an NR cell supporting RedCap. The terminal 110 may scan the cell using a frequency of the database for RedCap. The terminal 110 may detect an NR cell. The terminal 110 may identify whether the NR cell supports the RedCap function, based on system information (e.g., SIB 1) about the NR cell. According to an embodiment, the terminal 110 may identify whether the NR cell supports RedCap, based on the method exemplified in the operation 503 (e.g., determination based on whether the intra frequency selection information ('intraFreqReselectionRedCap' IE) is included in SIB 1). Then, the terminal 110 may perform a registration procedure in the detected NR cell. When the detected NR cell is registered, the terminal 110 may perform communication based on the RedCap mode.

As described above, even if an emergency service is triggered in a non-3GPP access or airplane mode, and an NR cell not supporting RedCap is first discovered, the terminal 110 may perform access to the NR cell. If the terminal 110 again searches for an NR cell supporting RedCap, the emergency service may be delayed. Accordingly, the operation mode switching according to the embodiments of the disclosure makes a starting time of the emergency service faster.

Figure 12B:
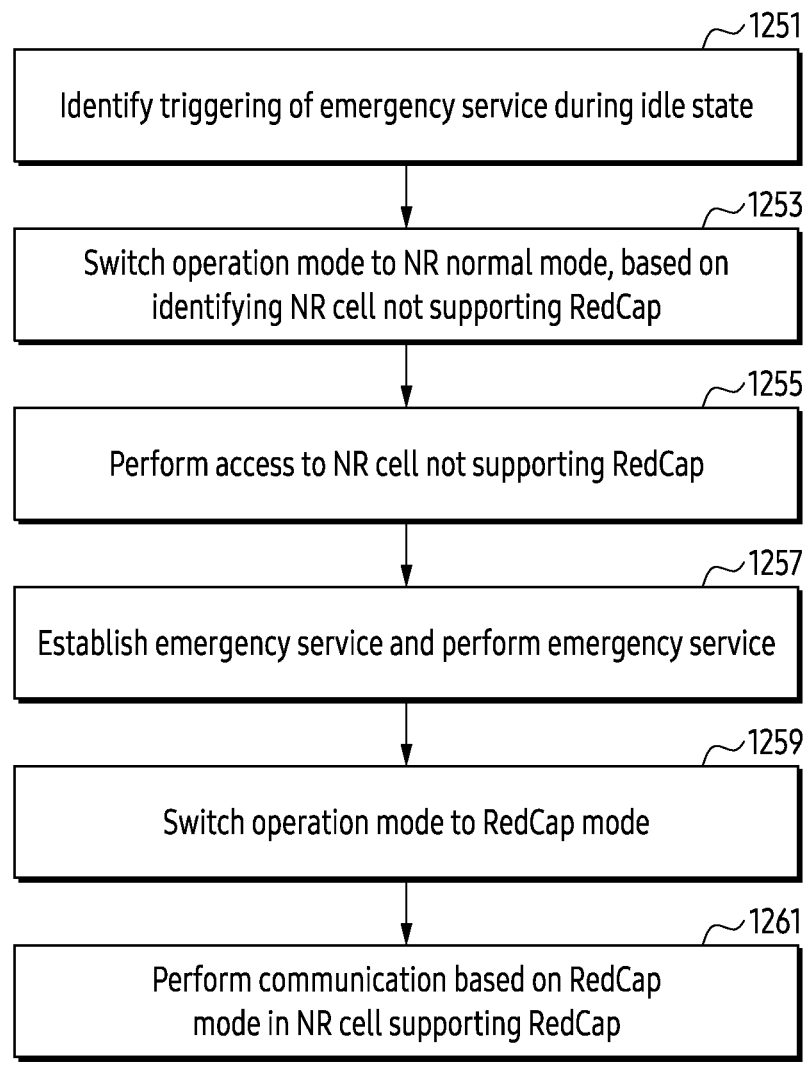
FIG. 12B illustrates an example operation flow of a terminal for performing an emergency service in an idle state.

FIG. 12B illustrates an example operation flow of a terminal (e.g., the terminal 110) for performing an emergency service in its idle state.

Referring to FIG. 12B, in operation 1251, the terminal 110 may identify triggering of an emergency service during its idle state. The terminal 110 may identify that the emergency service is triggered in the RRC idle state rather than the RRC connected state. The terminal 110 may perform a cell selection or a cell reselection to perform the emergency service.

In operation 1253, the terminal 110 may switch the operation mode to the NR normal mode, based on identifying an NR cell that does not support RedCap. The terminal 110 may identify an NR cell that does not support RedCap. The terminal 110 may identify that the NR cell does not support RedCap, based on the system information of the NR cell. Although the terminal 110 supports the RedCap mode, the terminal 110 may change the priority operation mode to perform the emergency service on the NR cell.

In operation 1255, the terminal 110 may access an NR cell that does not support RedCap. The terminal 110 may perform a random access procedure with a base station providing the NR cell. The terminal 110 may perform a registration procedure for the NR cell through NAS signaling with the core network entity (e.g., AMF).

In operation 1257, the terminal 110 may establish an emergency service and perform the emergency service. Unlike the previous handover, since the terminal 110 does not have any valid RRC connection such as an LTE cell, the terminal 110 may not be able to establish the emergency service before accessing the NR cell. The terminal 110 may establish the triggered emergency service after accessing the NR cell. After establishing the emergency service, the terminal 110 may perform the emergency service on the NR cell. In this case, the operation mode of the terminal 110 may be an NR normal mode.

In operation 1259, the terminal 110 may switch the operation mode to the RedCap mode. The terminal 110 may operate with the NR normal mode, until the emergency service is terminated. When the emergency service is terminated, the terminal 110 may change the operation mode. When the emergency service is terminated, the terminal 110 may switch back to the RedCap mode to save power.

In operation 1261, the terminal 110 may perform communication based on the RedCap mode in an NR cell supporting RedCap. The terminal 110 may scan a cell using a frequency of the database for RedCap. The terminal 110 may detect an NR cell. The terminal 110 may identify whether the NR cell supports the RedCap function, based on the system information (e.g., SIB 1) about the NR cell. According to an embodiment, the terminal 110 may identify whether the NR cell supports RedCap, based on the method exemplified in the operation 503 (e.g., determination based on whether the ultra frequency selection information ('intraFreqReselectionRedCap' IE) is included in SIB 1). Then, the terminal 110 may perform a registration procedure in the detected NR cell. When the detected NR cell is registered, the terminal 110 may perform communication based on the RedCap mode.

As described above, even if an emergency service is triggered in an idle state of terminal 110 and an NR cell not supporting RedCap is first discovered, the terminal 110 may perform access to the NR cell. If the terminal 110 again searches for an NR cell supporting RedCap, the emergency service may be delayed. Accordingly, the operation mode switching according to the embodiments of the disclosure makes a starting time of the emergency service faster.

Figure 13:
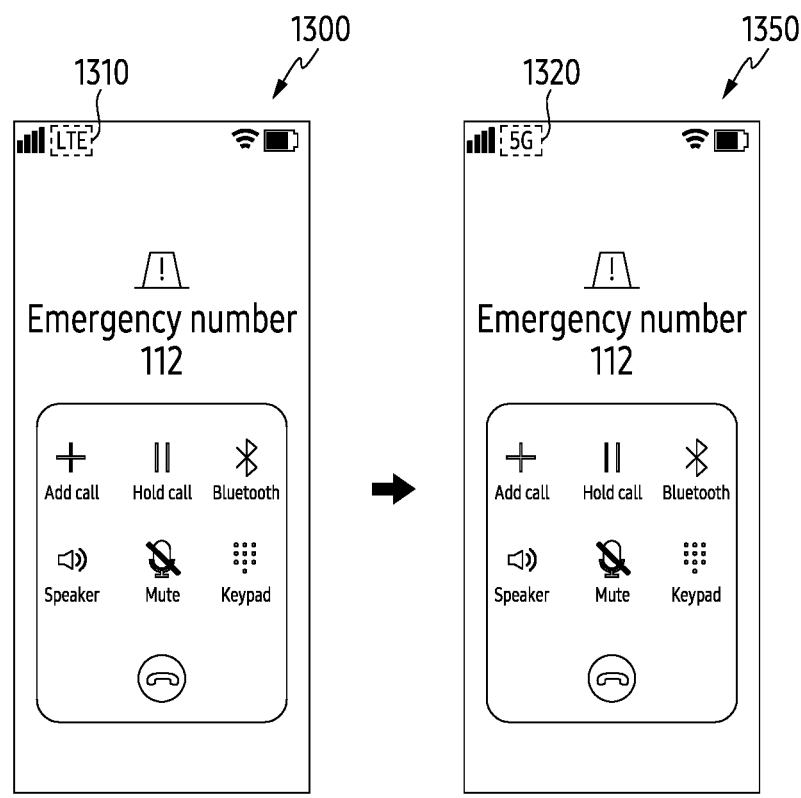
FIG. 13 illustrates an example of a terminal performing an emergency service through an NR cell that does not support a RedCap function.

FIG. 13 illustrates an example of a terminal performing an emergency service through an NR cell that does not support the RedCap function.

Referring to FIG. 13, a first screen 1300 illustrates an example of displaying of a terminal for performing an emergency service when an operation mode switching is not applied according to embodiments of the disclosure. The terminal may fall back to the LTE cell after performing communication with an NR cell in the RedCap mode. In case where the terminal receives a handover command to the NR cell not supporting the RedCap function, while performing an emergency service in the LTE cell, the terminal may again perform the RRE to the LTE cell to maintain the emergency service. Accordingly, a visual object 1310 for indicating a communication scheme in the first screen 1300 may be indicated as 'LTE'.

A second screen 1350 illustrates an example of displaying of the terminal 110 for performing an emergency service when an operation mode switching is applied according to embodiments of the disclosure. The terminal 110 may fall back to the LTE cell after performing communication with the NR cell in the RedCap mode. In case where the terminal 110 receives a handover command to the NR cell not supporting the RedCap function, while performing the emergency service in the LTE cell, the terminal 110 may perform the operation mode switching to maintain the emergency service. The terminal 110 may change the operation mode from the RedCap mode to the NR normal mode. The terminal 110 may access the NR cell that does not support the RedCap function. The terminal 110 may operate with the NR normal mode on the NR cell that does not support the RedCap function. The terminal 110 may perform the emergency service on the NR cell that does not support the RedCap function. Accordingly, a visual object 1320 for indicating a communication scheme in the second screen 1350 may be indicated as '5G'.

Figure 14:
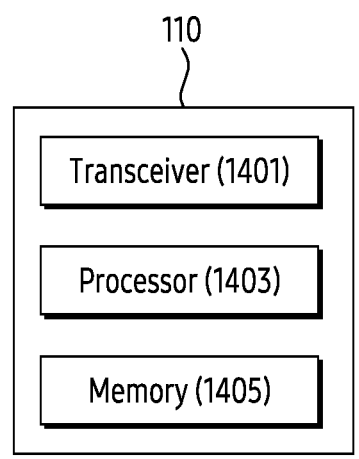
FIG. 14 illustrates an example of a functional configuration of a terminal.

FIG. 14 illustrates an example of functional configuration of a terminal (e.g., the terminal 110). According to an embodiment, the terminal 110 illustrates a RedCap UE supporting the RedCap function.

Referring to FIG. 14, the terminal 110 may include at least one processor 1403, at least one memory 1405, and at least one transceiver 1401. Hereinafter, the elements will be described in a singular form, but the implementation of a plurality of elements or sub-elements is not excluded.

The transceiver 1401 is configured to perform functions for transmitting or receiving signals through a wireless channel. For example, the transceiver 1401 is configured to perform a conversion function between a baseband signal and a bit string according to a physical layer standard of a system. For example, during data transmission, the transceiver 1401 generates complex symbols by encoding and modulating a transmit bit string. Further, during data reception, the transceiver 1401 restores a receive bit string by demodulating and decoding the baseband signal. In addition, the transceiver 1401 up-converts the baseband signal into a radio frequency (RF) band signal to transmit the RF band signal through an antenna, and down-converts the RF band signal received through the antenna into the baseband signal.

To this end, the transceiver 1401 may include a transmission filter, a reception filter, an amplifier, a mixer, an oscillator, a digital-to-analog converter (DAC), an analog-to-digital converter (ADC), or the like. Further, the transceiver 1401 may include a plurality of transmission/reception paths. Furthermore, the transceiver 1401 may include an antenna unit. The transceiver 1401 may include at least one antenna array having a plurality of antenna elements. In terms of hardware, the transceiver 1401 may be configured of a digital circuit and an analog circuit (e.g., a radio frequency integrated circuit (RFIC)). Here, the digital circuit and the analog circuit may be implemented as a single package. Further, the transceiver 1401 may include a plurality of RF chains. The transceiver 1401 may perform beamforming. The transceiver 1401 may apply a beamforming weight to the signal for transmission/reception, so as to assign directivity according to the configuration of the processor 1403. According to an embodiment, the transceiver 1401 may include a radio frequency (RF) block (or an RF unit).

The transceiver 1401 is configured to transmit and receive signals as described above. Accordingly, the transceiver 1401 may be referred to as 'transmitter', 'receiver', or 'transceiver unit'. According to an embodiment, the transceiver 1401 may provide an interface for communicating with other nodes in a network. That is, the transceiver 1401 may be configured to convert a bit string transmitted from the terminal 110 to another node, for example, another access node, another base station, an upper node, a core network, or the like, into a physical signal, and convert a physical signal received from another node into a bit string.

The processor 1403 controls the overall operations of the terminal 110. For example, the processor 1403 records and reads data in the memory 1405. For example, the processor 1403 transmits and receives signals through the transceiver 1401. Although FIG. 14 illustrates one processor, the embodiments of the disclosure are not limited thereto. The terminal 110 may include at least one processor to perform the embodiments of the disclosure. The processor 1403 may be referred to as a control unit or a control means. According to embodiments, the processor 1403 may control the terminal 110 to perform at least one of operations or methods according to embodiments of the disclosure.

The memory 1405 may store data such as a basic program, an application program, and configuration information for operating the terminal 110. The memory 1405 may store various data used by at least one element (e.g., the transceiver 1401 or the processor 1403) described above. The data may include, for example, software and input or output data for commands related thereto. The memory 1405 may include a volatile memory, a non-volatile memory, or a combination of the volatile memory and the non-volatile memory. The memory 1405 may provide stored data according to a request of the processor 1403.

Figure 15:
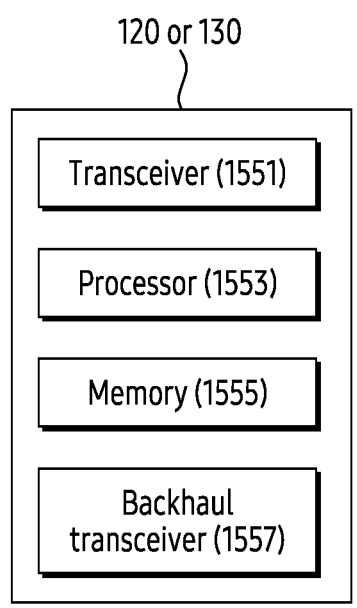
FIG. 15 illustrates an example of a functional configuration of a base station.

FIG. 15 illustrates an example of functional configuration of a base station (e.g., the base station 120 or the base station 130). According to an embodiment, the base station 120 may be exemplified as an eNB, and the base station 130 may be exemplified as a gNB.

Referring to FIG. 15, the base station 120 or the base station 130 may include a transceiver 1551, a processor 1553, a memory 1555, and a backhaul transceiver 1557.

The transceiver 1551 may perform functions for transmitting and receiving signals in a wired communication environment. The transceiver 1551 may include a wired interface for controlling a device-to-device direct connection through a transmission medium (e.g., copper wire, optical fiber, or the like). For example, the transceiver 1551 may transmit an electrical signal to another device through such a copper wire or may perform a conversion between an electrical signal and an optical signal.

The transceiver 1551 may perform functions for transmitting and receiving signals in a wireless communication environment. For example, the transceiver 1551 may perform a conversion function between a baseband signal and a bit string according to the physical layer standard of the system. For example, during data transmission, the transceiver 1551 generates complex-valued symbols by encoding and modulating a transmission bit string. Further, during data reception, the transceiver 1551 restores the receive bit string by demodulating and decoding the baseband signal. In addition, the transceiver 1551 may include a plurality of transmission/reception paths. Furthermore, according to an embodiment, the transceiver 1551 may be connected to a core network or may be connected to other nodes (e.g., an integrated access backhaul (IAB)).

The transceiver 1551 transmits and receives signals as described above. Accordingly, all or part of the transceiver 1551 may be referred to as 'communication unit', 'transmitter', a 'receiver', or a "transceiver unit". Further, in the following description, the term such as 'transmission' and 'reception' performed through a wireless channel may be used as a meaning including that the above-described processing is performed by the transceiver 1551.

The processor 1553 controls the overall operations of the base station 120 or the base station 130. The processor 1553 may be referred to as a controller or a control unit. For example, the processor 1553 transmits and receives signals through the transceiver 1551 (or through the backhaul transceiver 1557). Further, the processor 1553 may record and read data in the memory 1555. Further, the processor 1553 may perform functions of a protocol stack required by a corresponding communication standard. Although only the processor 1553 is illustrated in FIG. 15, the base station 120 or the base station 130 may include two or more processors, according to an example of another implementation.

The memory 1555 may store data such as a basic program, an application program, and configuration information for operating the base station 120 or the base station 130. The memory 1555 may be referred to as a storage. The memory 1555 may include a volatile memory, a non-volatile memory, or a combination of the volatile memory and the non-volatile memory. Further, the memory 1555 provides stored data according to a request of the processor 1553.

The base station 120 or the base station 130 may further include a backhaul transceiver 1557 to be connected to a core network or another base station (e.g., the base station 130 or the base station 120). The backhaul transceiver 1557 provides an interface for communicating with other nodes in the network. That is to say, the backhaul transceiver 1557 may convert a bit string transmitted from a base station to another node, for example, another access node, another base station, an upper node, a core network, or the like, into a physical signal, and convert a physical signal received from the other node into a bit string.

According to embodiments, a method performed by a terminal in a wireless communication system may comprise receiving, from a serving base station, a radio resource control (RRC) message including a handover command to a New Radio (NR) cell, while performing an emergency service on a Long-Term Evolution (LTE) cell. The method may comprise identifying whether the NR cell supports a reduced capability (RedCap) function or not based on system information on the NR cell. The method may comprise, in case that the NR cell does not support the RedCap function, switching an operation mode of the terminal from a RedCap mode to a NR normal mode. The method may comprise, while the terminal operates in the NR normal mode, performing the emergency service on the NR cell through an access to the NR cell. The method may comprise, in response to a termination of the emergency service, switching the operation mode of the terminal from the NR normal mode to the RedCap mode.

According to an embodiment, the system information may comprise system information block (SIB) 1. Further, whether the NR cell supports the RedCap function or not is determined according to whether intra frequency selection information is included in the SIB 1 or not.

According to an embodiment, the system information may comprise system information block (SIB) 1. The SIB 1 may include at least one of first information for indicating whether a cell supports half-duplex frequency division duplexing (FDD), second information for indicating whether a cell is barred for a terminal having one reception branch, and third information for indicating whether a cell is blocked for a terminal having two reception branches. Whether the NR cell supports the RedCap function or not may be determined based on at least one of the first information, the second information, or the third information.

According to an embodiment, the performing of the emergency service may comprise performing a random access procedure with a target base station providing the NR cell. The performing of the emergency service may comprise performing a registration procedure with an access management function (AMF) associated with the NR cell. The performing of the emergency service may comprise performing the emergency service on the NR cell after the registration procedure is completed.

According to an embodiment, the method may further comprise identifying a target NR cell supporting the RedCap function, after the switching of the operation mode of the terminal from the RedCap mode to the NR normal mode. The method may further comprise performing a random access procedure on the target NR cell.

According to an embodiment, the identifying of the target NR cell may comprise identifying cell information from a database for the RedCap function. The identifying of the target NR cell may comprise identifying whether a cell searched based on the cell information supports the RedCap function or not. The identifying of the target NR cell may comprise, in case that the searched cell supports the RedCap function, determining the searched cell as the target NR cell.

According to an embodiment, the identifying of the target NR cell may comprise obtaining a search result through a searching of all frequencies in the database. The identifying of the target NR cell may comprise obtaining a stored frequency list, based on identifying that a NR cell supporting the RedCap function is not detected, through the search result. The identifying of the target NR cell may comprise identifying a target NR cell supporting the RedCap function through a frequency scanning performed based on the stored frequency list.

According to an embodiment, the method may further comprises operating the RedCap mode in another NR cell, before performing the emergency service in the LTE cell. The method may further comprise storing information on the another NR cell to a database for the RedCap function.

According to an embodiment, the RRC message may include identification information for the NR cell and system information for the NR cell. The system information for the NR cell may be used to indicate whether the NR cell supports the RedCap function.

According to an embodiment, when the operation mode is the RedCap mode, the maximum bandwidth may be configured as 20 megahertz (MHz) in frequency range (FR) 1 or 100 MHz in FR 2. When the operation mode is the RedCap mode, the maximum modulation order may be configured as 64 quadrature amplitude modulation (QAM). The maximum number of receive antennas for the NR normal mode is 2 or 4. The maximum number of receive antennas for the RedCap mode may be configured to be a half of the maximum number of receive antennas for the NR normal mode. The maximum number of layers of downlink multiple input multiple output (MIMO) for the RedCap mode may be configured to be equal to the maximum number of receive antennas for the NR normal mode.

According to embodiments, a terminal (or an apparatus) in a wireless communication system may comprise at least one transceiver and at least one processor coupled to the at least one transceiver. The at least one processor may be configured to receive, from a serving base station, a radio resource control (RRC) message including a handover command to a New Radio (NR) cell, while performing an emergency service on a Long-term Evolution (LTE) cell. The at least one processor may be configured to identify whether the NR cell supports a reduced capability (RedCap) function or not, based on system information on the NR cell. The at least one processor may be configured to, in case that the NR cell does not support the RedCap function, switch an operation mode of the terminal from a RedCap mode to a NR normal mode. The at least one processor may be configured to, while the terminal operates in the NR normal mode, perform the emergency service on the NR cell through an access to the NR cell. The at least one processor may be configured to, in response to a termination of the emergency service, switch the operation mode of the terminal from the NR normal mode to the RedCap mode.

According to an embodiment, the system information may comprise system information block (SIB) 1. Whether the NR cell supports the RedCap function or not may be determined according to whether intra frequency selection information is included in the SIB 1 or not.

According to an embodiment, the system information may comprise system information block (SIB) 1. The SIB 1 may include at least one of first information for indicating whether a cell supports half-duplex frequency division duplexing (FDD), second information for indicating whether a cell is barred for a terminal having one reception branch, and third information for indicating whether a cell is blocked for a terminal having two reception branches. Whether the NR cell supports the RedCap function or not may be determined based on at least one of the first information, the second information, or the third information.

According to an embodiment, in order to perform the emergency service, the at least one processor may be configured to perform a random access procedure with a target base station providing the NR cell. In order to perform the emergency service, the at least one processor may be configured to perform a registration procedure with an access management function (AMF) associated with the NR cell. In order to perform the emergency service, the at least one processor may be configured to perform the emergency service on the NR cell, after the registration procedure is completed.

According to an embodiment, the at least one processor may be further configured to identify a target NR cell supporting the RedCap function, after the switching of the operation mode of the terminal from the RedCap mode to the NR normal mode. The at least one processor may be further configured to perform a random access procedure on the target NR cell.

According to an embodiment, in order to identify the target NR cell, the at least one processor may be configured to identify cell information from a database for the RedCap function. In order to identify the target NR cell, the at least one processor may be configured to identify whether or not a cell searched based on the cell information supports the RedCap function. In order to identify the target NR cell, the at least one processor may be configured to, in case that the searched cell supports the RedCap function, determine the searched cell as the target NR cell.

According to an embodiment, in order to identify the target NR cell, the at least one processor may be configured to obtain a search result through a searching of all frequencies in the database. In order to identify the target NR cell, the at least one processor may be configured to obtain a stored frequency list, based on identifying that a NR cell supporting the RedCap function is not detected. In order to identify the target NR cell, the at least one processor may be configured to identify a target NR cell supporting the Red-Cap function through a frequency scanning performed based on the frequency list.

According to an embodiment, the at least one processor may be further configured to operate the RedCap mode in another NR cell, before performing the emergency service in the LTE cell. The at least one processor may be further configured to store information on the another NR cell to a database for the RedCap function.

According to an embodiment, the RRC message may include identification information for the NR cell and system information for the NR cell. The system information for the NR cell may be used to indicate whether the NR cell supports the RedCap function.

According to an embodiment, when the operation mode is the RedCap mode, the maximum bandwidth may be configured as 20 megahertz (MHz) in frequency range (FR) 1 or 100 MHz in FR 2. When the operation mode is the RedCap mode, the maximum modulation order may be configured as 64 quadrature amplitude modulation (QAM). The maximum number of receive antennas for the NR normal mode may be 2 or 4. The maximum number of receive antennas for the RedCap mode may be configured to be a half of the maximum number of receive antennas for the NR normal mode. The maximum number of layers of downlink multiple input multiple output (MIMO) for the RedCap mode may be configured to be equal to the maximum number of receive antennas for the NR normal mode.

According to an embodiment, the at least one processor is further configured to identify an extra power saving mode in case the terminal operates in an NR radio access technology (RAT).

According to an embodiment, the at least one processor is further configured to determine whether to fall back to an LTE RAT, communicate with the LTE RAT in response to a determination to fall back to the LTE RAT, and communicate with the NR RAT in response to a determination to not fall back to the LTE RAT.

According to an embodiment, the extra power saving mode is supported in the RedCap mode based on the terminal performing at least one of a DRX expansion operation, a bandwidth part (BWP) reduction operation, or a radio resource management (RRM) relaxation operation.

According to embodiments, a non-transitory computer-readable medium is provided. The non-transitory computer-readable comprise a memory storing instructions. When the instructions are executed by a processor, the instructions cause the terminal to receive, from a serving base station, a radio resource control (RRC) message including a handover command to a new radio (NR) cell, while performing an emergency service on a long term evolution (LTE) cell, identify whether the NR cell supports a reduced capability (RedCap) function or not based on system information on the NR cell, in case that the NR cell does not support the RedCap function, switch an operation mode of the terminal from a RedCap mode to an NR normal mode, while the terminal operates in the NR normal mode, perform the emergency service on the NR cell through an access to the NR cell, and in response to a termination of the emergency service, switch the operation mode of the terminal from the NR normal mode to the RedCap mode.

An electronic device and a method according to embodiments of the disclosure may access an NR cell without performing an RRE with an LTE cell, so as to perform an emergency service in the normal mode and not the RedCap mode, even when receiving a handover command to an NR cell not supporting the RedCap function, thereby enabling the system to have reduced service disconnection and improve communication performance.

The effects that can be obtained from the disclosure are not limited to those described above, and any other effects not mentioned herein will be clearly understood by those having ordinary knowledge in the technical field to which the disclosure belongs, from the foregoing description.

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

The methods according to various embodiments described in the claims and/or the specification of the disclosure may be implemented in the form of hardware, software, or a combination of hardware and software.

When implemented by software, a computer-readable storage medium storing one or more programs (software modules) may be provided. One or more programs stored in such a computer-readable storage medium are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EE-PROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective constituent memories may be provided in a multiple number.

Further, the program may be stored in an attachable storage device that can be accessed via a communication network such as e.g., Internet, Intranet, local area network (LAN), wide area network (WAN), or storage area network (SAN), or a communication network configured with a combination thereof. Such a storage device may be accessed to an apparatus performing an embodiment of the disclosure through an external port. Further, a separate storage device on the communication network may be accessed to an apparatus performing an embodiment of the disclosure.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. A method performed by a terminal, the method comprising:
   receiving, from a serving base station, a radio resource control (RRC) message including a handover command to a new radio (NR) cell, while performing an emergency service on a long term evolution (LTE) cell;
   identifying whether the NR cell supports a reduced capability (RedCap) function or not based on system information on the NR cell;
   in case that the NR cell does not support the RedCap function, switching an operation mode of the terminal from a RedCap mode to an NR normal mode;
   while the terminal operates in the NR normal mode, performing the emergency service on the NR cell through an access to the NR cell; and
   in response to a termination of the emergency service, switching the operation mode of the terminal from the NR normal mode to the RedCap mode.

2. The method of claim 1,
   wherein the system information comprises a system information block (SIB) 1, and
   wherein whether the NR cell supports the RedCap function or not is determined according to whether intra frequency selection information is included in the SIB 1 or not.

3. The method of claim 1,
   wherein the system information comprises a system information block (SIB) 1,
   wherein the SIB 1 includes at least one of first information for indicating whether a cell supports half-duplex frequency division duplexing (FDD), second information for indicating whether a cell is barred for a terminal having one reception branch, and third information for indicating whether a cell is blocked for a terminal having two reception branches, and
   wherein whether the NR cell supports the RedCap function or not is determined based on at least one of the first information, the second information, or the third information.

4. The method of claim 1, wherein the performing of the emergency service comprises:
   performing a random access procedure with a target base station providing the NR cell;
   performing a registration procedure with an access management function (AMF) associated with the NR cell; and
   performing the emergency service on the NR cell after the registration procedure is completed.

5. The method of claim 1, further comprising:
   identifying a target NR cell supporting the RedCap function, after the operation mode of the terminal is switched from the RedCap mode to the NR normal mode; and
   performing a random access procedure on the target NR cell.

6. The method of claim 5, wherein the identifying of the target NR cell comprises:
- identifying cell information from a database for the RedCap function;
- identifying whether a cell searched based on the cell information supports the RedCap function or not; and
- in case that the searched cell supports the RedCap function, determining the searched cell as the target NR cell.

7. The method of claim 6, wherein the identifying of the target NR cell comprises:
- obtaining a search result through a searching of all frequencies in the database;
- obtaining a stored frequency list, based on identifying that a NR cell supporting the RedCap function is not detected; and
- identifying a cell supporting the RedCap function through a frequency scanning performed according to the stored frequency list as the target NR cell.

8. The method of claim 1, further comprising:
- operating the RedCap mode in another NR cell, before performing the emergency service in the LTE cell; and
- storing information on the another NR cell to a database for the RedCap function.

9. The method of claim 1,
- wherein the RRC message includes identification information for the NR cell and system information for the NR cell, and
- wherein the system information for the NR cell is used to indicate whether the NR cell supports the RedCap function.

10. The method of claim 1,
- wherein, in case of the operation mode being the RedCap mode, a maximum bandwidth is configured as 20 megahertz (MHz) in frequency range (FR) 1 or 100 MHz in FR 2,
- wherein, in case of the operation mode being the RedCap mode, a maximum modulation order is configured as 64 quadrature modulation (QAM),
- wherein a maximum number of receive antennas for the NR normal mode is 2 or 4,
- wherein a maximum number of receive antennas for the RedCap mode is configured to be a half of the maximum number of receive antennas for the NR normal mode, and
- wherein a maximum number of layers of downlink multiple input multiple output (MIMO) for the RedCap mode is configured to be equal to the maximum number of receive antennas for the NR normal mode.

11. A terminal in a wireless communication system, the terminal comprising:
- at least one transceiver; and
- at least one processor coupled to the at least one transceiver,
- wherein the at least one processor is configured to:
  - receive, from a serving base station, a radio resource control (RRC) message including a handover command to a new radio (NR) cell, while performing an emergency service on a long term evolution (LTE) cell,
  - identify whether the NR cell supports a reduced capability (RedCap) function or not based on system information on the NR cell,
  - in case that the NR cell does not support the RedCap function, switch an operation mode of the terminal from a RedCap mode to an NR normal mode,
  - while the terminal operates in the NR normal mode, perform the emergency service on the NR cell through an access to the NR cell, and
  - in response to a termination of the emergency service, switch the operation mode of the terminal from the NR normal mode to the RedCap mode.

12. The terminal of claim 11,
- wherein the system information comprises system information block (SIB) 1, and
- wherein whether the NR cell supports the RedCap function or not is determined according to whether intra frequency selection information is included in the SIB 1 or not.

13. The terminal of claim 11,
- wherein the system information comprises a system information block (SIB) 1,
- wherein the SIB 1 includes at least one of first information for indicating whether a cell supports half-duplex frequency division duplexing (FDD), second information for indicating whether a cell is barred for a terminal having one reception branch, and third information for indicating whether a cell is blocked for a terminal having two reception branches, and
- wherein whether the NR cell supports the RedCap function or not is determined based on at least one of the first information, the second information, or the third information.

14. The terminal of claim 11, wherein, to perform the emergency service, the at least one processor is configured to:
- perform a random access procedure with a target base station providing the NR cell;
- perform a registration procedure with an access management function (AMF) associated with the NR cell; and
- perform the emergency service on the NR cell after the registration procedure is completed.

15. The terminal of claim 11, wherein the at least one processor is further configured to:
- identify a target NR cell supporting the RedCap function, after the operation mode of the terminal is switched from the RedCap mode to the NR normal mode; and
- perform a random access procedure on the target NR cell.

16. The terminal of claim 15, wherein, to identify the target NR cell, the at least one processor is further configured to:
- identify cell information from a database for the RedCap function;
- identify whether a cell searched based on the cell information supports the RedCap function or not; and
- in case that the searched cell supports the RedCap function, determine the searched cell as the target NR cell.

17. The terminal of claim 16, wherein, to identify the target NR cell, the at least one processor is further configured to:
- obtain a search result through a searching of all frequencies in the database;
- obtain a stored frequency list, based on identifying that a NR cell supporting the RedCap function is not detected; and
- identify a cell supporting the RedCap function through a frequency scanning performed according to the stored frequency list as the target cell.

18. The terminal of claim 11, wherein the at least one processor is further configured to:
- operate the RedCap mode in another NR cell, before performing the emergency service in the LTE cell; and store information on the another NR cell to a database for the RedCap function.

19. The terminal of claim 11,
wherein the RRC message includes identification information for the NR cell and system information for the NR cell, and
wherein the system information for the NR cell is used to indicate whether the NR cell supports the RedCap function.

20. A non-transitory computer-readable medium comprising a memory storing instructions, wherein, when the instructions are executed by a processor, the instructions cause a terminal to:
receive, from a serving base station, a radio resource control (RRC) message including a handover command to a new radio (NR) cell, while performing an emergency service on a long term evolution (LTE) cell,
identify whether the NR cell supports a reduced capability (RedCap) function or not based on system information on the NR cell,
in case that the NR cell does not support the RedCap function, switch an operation mode of the terminal from a RedCap mode to an NR normal mode,
while the terminal operates in the NR normal mode, perform the emergency service on the NR cell through an access to the NR cell, and
in response to a termination of the emergency service, switch the operation mode of the terminal from the NR normal mode to the RedCap mode.

* * * * *